United States Patent
Lim et al.

(10) Patent No.: US 11,012,227 B2
(45) Date of Patent: May 18, 2021

(54) AUTHENTICATION METHOD AND SYSTEM FOR DEVICE USING BLUETOOTH TECHNOLOGY

(71) Applicant: LG ELECTRONICS INC., Seoul (KR)

(72) Inventors: Jinkwon Lim, Seoul (KR); Jingu Choi, Seoul (KR); Younghwan Kwon, Seoul (KR); Taeyoung Song, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 319 days.

(21) Appl. No.: 16/314,378

(22) PCT Filed: Jun. 30, 2017

(86) PCT No.: PCT/KR2017/006967
§ 371 (c)(1),
(2) Date: Dec. 28, 2018

(87) PCT Pub. No.: WO2018/004303
PCT Pub. Date: Jan. 4, 2018

(65) Prior Publication Data
US 2019/0159030 A1 May 23, 2019

Related U.S. Application Data

(60) Provisional application No. 62/357,384, filed on Jul. 1, 2016, provisional application No. 62/426,528, filed on Nov. 26, 2016.

(51) Int. Cl.
*H04L 9/08* (2006.01)
*H04L 9/32* (2006.01)
(Continued)

(52) U.S. Cl.
CPC .......... *H04L 9/0631* (2013.01); *H04L 9/0643* (2013.01); *H04L 9/30* (2013.01);
(Continued)

(58) Field of Classification Search
CPC ........ H04L 9/0631; H04L 9/30; H04W 12/06; H04W 12/04; H04W 4/80; H04W 68/00; H04W 76/14
(Continued)

(56) References Cited

U.S. PATENT DOCUMENTS 6,766,160 B1 * 7/2004 Lemilainen ........... H04W 12/06
455/41.2
8,595,810 B1 * 11/2013 Ben Ayed ........... H04L 63/0815
726/8
(Continued)

FOREIGN PATENT DOCUMENTS

| WO | 2015194854 | 12/2015 |
|---|---|---|
| WO | 2016017909 | 2/2016 |
| WO | 2016080798 | 5/2016 |

OTHER PUBLICATIONS

PCT International Application No. PCT/KR2017/006967, International Search Report dated Oct. 24, 2017, 3 pages.

*Primary Examiner* — Haresh N Patel
(74) *Attorney, Agent, or Firm* — Lee, Hong, Degerman, Kang & Waimey PC

(57) ABSTRACT

Disclosed is an authentication method and system for a device using a Bluetooth technology. A method for performing authentication by a first device, using Bluetooth low energy (LE), according to an embodiment of the present invention comprises: authenticating a user on the basis of ID information of the user; and authenticating a device by comparing information acquired from a user input with information acquired using an exchanged public key. The (Continued)

authentication scheme for a device is determined according to the input/output capability of the device.

20 Claims, 36 Drawing Sheets

(51) Int. Cl.
| | |
|---|---|
| *H04W 4/00* | (2018.01) |
| *H04L 29/06* | (2006.01) |
| *H04L 9/06* | (2006.01) |
| *H04W 12/041* | (2021.01) |
| *H04W 12/50* | (2021.01) |
| *H04W 12/069* | (2021.01) |
| *H04W 12/0431* | (2021.01) |
| *H04W 12/06* | (2021.01) |
| *H04W 76/14* | (2018.01) |
| *H04W 4/80* | (2018.01) |
| *H04L 9/30* | (2006.01) |
| *H04W 68/00* | (2009.01) |

(52) U.S. Cl.
CPC ............ *H04L 9/3226* (2013.01); *H04W 4/80* (2018.02); *H04W 12/041* (2021.01); *H04W 12/0431* (2021.01); *H04W 12/06* (2013.01); *H04W 12/069* (2021.01); *H04W 12/50* (2021.01); *H04W 68/005* (2013.01); *H04W 76/14* (2018.02); *H04L 2209/805* (2013.01)

(58) Field of Classification Search
USPC .......................................................... 713/171
See application file for complete search history.

(56) References Cited

U.S. PATENT DOCUMENTS

| | | | | |
|---|---|---|---|---|
| 2004/0176071 A1* | 9/2004 | Gehrmann | .......... | H04L 63/0853 455/411 |
| 2010/0319055 A1* | 12/2010 | Tamura | ................ | H04L 63/105 726/4 |
| 2012/0063598 A1 | 3/2012 | Huh | | |
| 2012/0196569 A1* | 8/2012 | Holtmanns | ........... | H04W 12/04 455/411 |
| 2014/0206346 A1* | 7/2014 | Kiukkonen | ......... | H04W 52/028 455/426.1 |
| 2014/0301552 A1 | 10/2014 | Yi et al. | | |
| 2014/0373123 A1* | 12/2014 | Kang | ...................... | G06F 21/10 726/7 |
| 2015/0134552 A1* | 5/2015 | Engels | .................. | H04L 9/3247 705/318 |
| 2015/0147970 A1* | 5/2015 | Tan | ...................... | H04W 12/003 455/41.2 |
| 2015/0188891 A1* | 7/2015 | Grange | .................. | H04L 9/3242 380/270 |
| 2015/0221152 A1* | 8/2015 | Andersen | .................. | G07C 9/21 340/5.22 |
| 2015/0256391 A1* | 9/2015 | Hardy | .................. | H04L 41/5054 709/222 |
| 2015/0288694 A1* | 10/2015 | Liebl, III | ............ | H04L 63/0884 713/182 |
| 2015/0302732 A1* | 10/2015 | Wright | ............. | H04N 21/42204 340/5.25 |
| 2015/0324605 A1* | 11/2015 | Yoon | ................... | G06F 21/6245 726/28 |
| 2015/0332258 A1* | 11/2015 | Kurabi | ............... | G06Q 20/3278 705/71 |
| 2016/0050565 A1* | 2/2016 | Benoit | .................. | H04W 12/04 726/9 |
| 2016/0142402 A1* | 5/2016 | Kim | ........................ | H04W 4/02 726/4 |
| 2016/0156636 A1* | 6/2016 | Tan | ........................ | H04L 63/06 726/4 |
| 2016/0157049 A1* | 6/2016 | Choi | ........................ | H04W 4/80 455/41.2 |
| 2016/0197934 A1* | 7/2016 | Muraoka | ................. | G06F 21/34 726/7 |
| 2016/0358397 A1* | 12/2016 | Kristensen | ......... | G07C 9/00571 |
| 2017/0048239 A1* | 2/2017 | Jeon | ........................ | H04L 67/12 |

\* cited by examiner (a) Legacy Pairing     (b) Numeric Comparison

FIG. 8
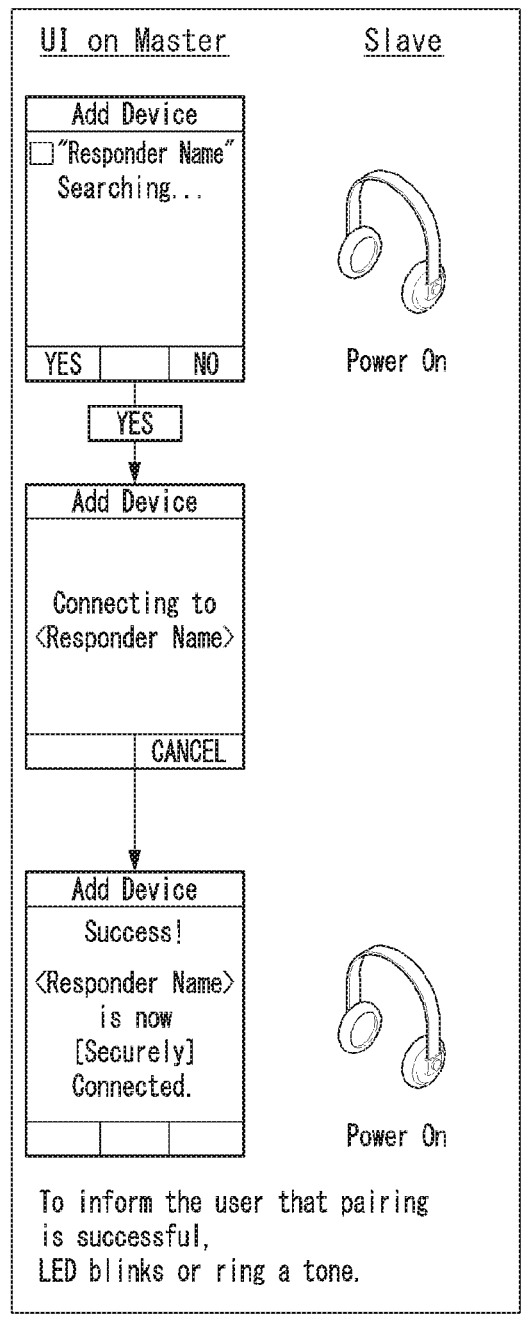
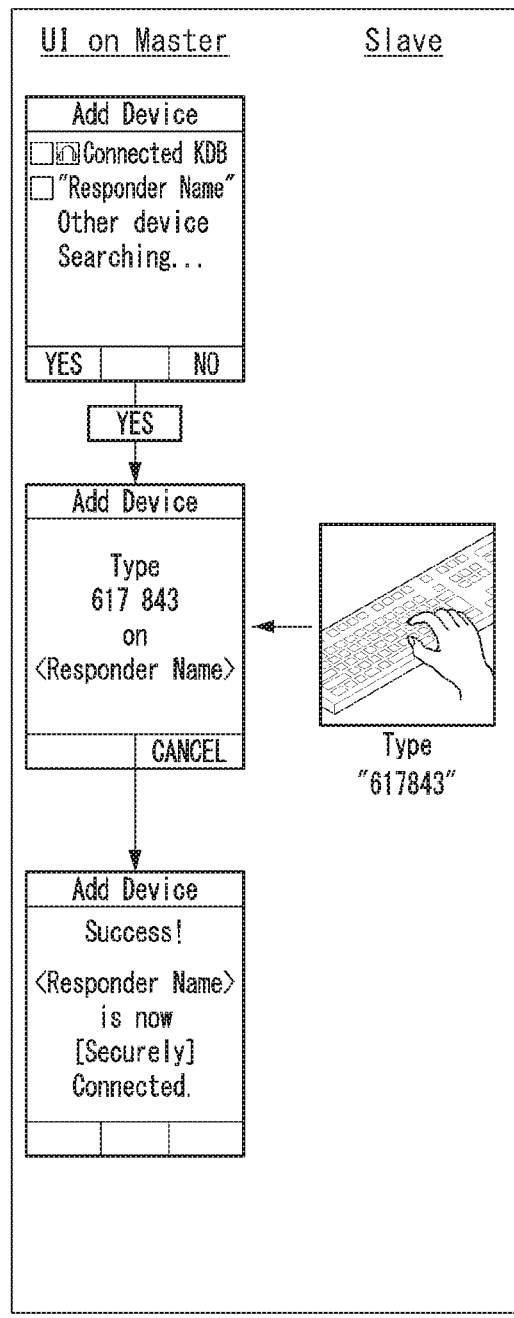
(a) Just Work
(b) Passkey Entry

FIG. 12

| Field name | Requirements | Size (octets) | Format | Information |
|---|---|---|---|---|
| Message Type | M | 1 | Uint | Set as UAS Feature Get |

(a) UAS Feature Get Message

| Field name | Size (octets) | Format | Information |
|---|---|---|---|
| Message Type | 1 | Uint | Set as UAS Feature |
| UAS Version | 1 | Uint | Valid range 1-255 |
| Feature Flags | 1 | Bitmap | Feature supported by UAS server<br><br>1= supported, 0=not supported<br><br>Bit definition<br><br>0 RFU<br>1 Support MACed Server-Issued Tokens<br>2 Support token lookup according to factor type<br>3 Support SAS-verified LTK<br>4 Support Set Time<br>5 Support Distance Bounding<br>6-7 RFU |
| Registration ID Count | 1 | Uint | Number of client registrations supported by server |
| Token Count | 1 | Uint | Number of tokens per registration ID supported by server |
| Factor Type List | 4 | Bitmap | - |
| UAS Server ID | 16 | GUID | GUID to uniquely identify OI UAS server |
| Max Clock Drift Rate | 2 | Uint | Max clock drift rate of UAS server |

(b) UAS Feature Message

FIG. 16

| Field name | Size (octets) | Format | Information |
|---|---|---|---|
| Message Type | 1 | Uint | Set as Registration Session Start |
| Reserved | 1 | Uint | Reserved, this field is set to 0 |
| Registration Session Number | 2 | Uint | Registration Session Number is provided by UAS client in order to correlate message with registration sequence and included in cryptographic calculations in order to prevent replay attack |
| Registration Session Start Flags | 1 | Uint | Flags related to Registration Session Start Message Bits Definition<br><br>0-4   Registration Type<br>      0 - RFU<br>      1 - Register with SAS confirmed LTK.<br>      2 - Register without SAS confirmed LTK.<br>      3-15 - RFU.<br>5-7   RFU. |

Start message

FIG. 17

| Field name | Size (octets) | Format | Information |
|---|---|---|---|
| Message Type | 1 | Uint | Set as Registration Session Server Hash Commit |
| Temporary Registration ID | 1 | Uint | Temporary Registration ID related to Registration Session |
| Registration Session Number | 2 | Uint | Registration Session Number is provided by UAS client in order to correlate message with registration sequence and included in cryptographic calculations in order to prevent replay attack |
| $H(KS_{PUB})$ | 16 | Uint | 128-bit hash of ECDH P-256-based server public key |
| User Interaction Type | 1 | Uint | User interaction type requested by UAS server |
| User Interaction Data | 4 | Uint | Data related to user interaction type requested by UAS server |

Server Hash Commit message

FIG. 18

| Field name | Size (octets) | Format | Information |
|---|---|---|---|
| Message Type | 1 | Uint | Set as Registration Session Client Public Key |
| Registration ID | 1 | Uint | Temporary Registration ID related to Registration Session |
| Registration Session Number | 2 | Uint | Registration Session Number is provided by UAS client in order to correlate message with registration sequence and included in cryptographic calculations in order to prevent replay attack |
| $KCX_{PUB}$ | 32 | Uint | Client public key X coordinates based on ECDH P-256 of 32 octets |
| $KCY_{PUB}$ | 32 | Uint | Client public key Y coordinates based on ECDH P-256 of 32 octets |
| $N_C$ | 16 | Uint | 16-byte nonce generated by UAS client |
| User Feedback Data | 4 | Uint | User input data collected by UAS client with respect to user interaction type requested by UAS server |

Client Public Key message

FIG. 19

| Field name | Size (octets) | Format | Information |
|---|---|---|---|
| Message Type | 1 | Uint | Set as Registration Session Client Public Key |
| Registration ID | 1 | Uint | Temporary Registration ID related to Registration Session |
| Registration Session Number | 2 | Uint | Registration Session Number is provided by UAS server in order to correlate message with registration sequence and included in cryptographic calculations in order to prevent replay attack |
| $KSX_{PUB}$ | 32 | Uint | Server public key X coordinates based on ECDH P-256 of 32 octets |
| $KSY_{PUB}$ | 32 | Uint | Server public key Y coordinates based on ECDH P-256 of 32 octets |
| $N_S$ | 16 | Uint | 16-byte nonce generated by UAS server |
| $MAC_S$ | 16 | Uint | Server public key hash used in UAS server in order to authenticate that key exchange occurs in intended UAS server. Hash includes registration ID |

Server Public Key message

FIG. 20

| Field name | Size (octets) | Format | Information |
|---|---|---|---|
| Message Type | 1 | Uint | Set as Registration Session Client Confirmation |
| Registration ID | 1 | Uint | Registration ID related to Registration Session |
| Registration Session Number | 2 | Uint | Registration Session Number is provided by UAS client in order to correlate message with registration sequence and included in cryptographic calculations in order to prevent replay attack |
| $MAC_C$ | 16 | Uint | Client public key hash used in UAS server in order to authenticate that key exchange occurs in intended UAS server. Hash includes registration ID |

(a) Client Confirmation message

| Field name | Size (octets) | Format | Information |
|---|---|---|---|
| Message Type | 1 | Uint | Set as Registration Session Abort |
| Registration ID | 1 | Uint | Registration ID related to Aborted Registration Session |

(b) Abort message

AUTHENTICATION METHOD AND SYSTEM FOR DEVICE USING BLUETOOTH TECHNOLOGY

CROSS-REFERENCE TO RELATED APPLICATIONS

This application is the National Stage filing under 35 U.S.C. 371 of International Application No. PCT/KR2017/006967, filed on Jun. 30, 2017, which claims the benefit of U.S. Provisional Application No. 62/357,384, filed on Jul. 1, 2016, and 62/426,528, filed on Nov. 26, 2016, the contents of which are all hereby incorporated by reference herein in their entirety.

TECHNICAL FIELD

The present invention relates to Bluetooth, a short-range communication technology in a wireless communication system and more specifically, a method and an apparatus for authenticating a device by using Bluetooth Low Energy (LE) technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An object of the present invention is to provide a method and an apparatus for authenticating a device by using the Bluetooth technology.

Also, an object of the present invention is to provide a method and an apparatus for authenticating a device by using user information to establish a Bluetooth connection.

Furthermore, an object of the present invention is to provide a method and apparatus for authenticating a user based on ID information of a user for a Bluetooth connection.

Furthermore, an object of the present invention is to provide a method and apparatus for authenticating a device through a different method based on the input/output function of a device.

Technical objects of the present invention are not limited to those described above, but other technical objects not mentioned in this document will be clearly understood from the descriptions given below by those skilled in the art to which the present invention belongs.

Technical Solution

In order to accomplish the objects, the present invention provides a method of performing authentication on a device a Bluetooth technology.

In order to accomplish the objects, a method of performing authentication by a first device using Bluetooth low energy (LE) according to an embodiment of the present invention includes forming a Bluetooth LE connection with a second device; obtaining identification information for identifying a user; performing a user authentication procedure of authenticating the user based on the identification information; transmitting, to the second device, a first notification message comprising an identifier corresponding to the identification information; receiving, from the second device, a write request message comprising a first public key; obtaining a first value for authentication of the second device using a first algorithm having the first public key as an input value; transmitting, to the second device, a second notification message comprising a second public key; and performing a device authentication procedure for authenticating the second device using a specific authentication method. The specific authentication method is determined based on the input/output capability of the first device.

In the method of performing authentication according to an embodiment of the present invention, the write request message includes information related to the input/output capability of the second device, and the second notification message includes information related to the input/output capability of the first device.

In the method of performing authentication according to an embodiment of the present invention, performing the device authentication procedure includes outputting specific information corresponding to the first value using the specific authentication method and obtaining input information for authenticating the second device based on the output of the specific information.

In the method of performing authentication according to an embodiment of the present invention, performing the device authentication procedure includes obtaining a second value through a second algorithm based on the input information and completing the authentication of the second device based on the first value and the second value.

In the method of performing authentication according to an embodiment of the present invention, in completing the device authentication, whether the device authentication is successful is determined based on whether the first value and the second value are identical.

In the method of performing authentication according to an embodiment of the present invention, the device authentication procedure uses one method of a PIN, a password, a pattern, vibration and an LED.

In the method of performing authentication according to an embodiment of the present invention, the identification information is one of a PIN, a gesture, a pattern, a password and bio information of the user.

In the method of performing authentication according to an embodiment of the present invention, the method further includes assigning a temporary identifier when the user is a new user of the first device and storing the temporary identifier as the identifier of the user.

The method of performing authentication according to an embodiment of the present invention further includes receiving, from the second device, an authentication method determination message comprising the user authentication procedure or an execution method of the device authentication procedure. The execution method is designated by the second device.

In order to achieve the objects, a method of performing authentication by a first device using Bluetooth low energy (LE) according to an embodiment of the present invention includes forming a Bluetooth LE connection with a second device; transmitting, to the second device, a write request message to request a start of an authentication procedure; receiving, from the second device, a notification message comprising an identifier corresponding to identification information of a user; transmitting, to the second device, a write request message comprising a first public key; receiving, from the second device, a notification message comprising a second public key; obtaining a first value for authentication of the second device using a first algorithm having the second public key as an input value; performing a device authentication procedure for authenticating the second device using a specific authentication method; and transmitting, to the second device, a write request message representing results of the device authentication procedure. The specific authentication method is determined based on an input/output capability of the first device.

A first device for performing authentication using Bluetooth low energy (LE) according to an embodiment of the present invention for achieving the objects form a Bluetooth LE connection with a second device; obtain identification information for identifying a user; perform a user authentication procedure of authenticating the user based on the identification information; transmit, to the second device, a first notification message comprising an identifier corresponding to the identification information; receive, from the second device, a write request message comprising a first public key; obtain a first value for authentication of the second device using a first algorithm having the first public key as an input value; transmit, to the second device, a second notification message comprising a second public key; and perform a device authentication procedure for authenticating the second device using a specific authentication method. The specific authentication method is determined based on an input/output capability of the first device.

Advantageous Effects

In accordance with the method and apparatus for authenticating a device using the Bluetooth technology according to an embodiment of the present invention, there is an effect in that an authentication procedure for a device connection can be performed.

Furthermore, in accordance with the present invention, there is an effect in that a device can be authenticated using information of a user for a Bluetooth connection.

Furthermore, in accordance with the present invention there is an effect in that an authentication procedure can be intuitively recognized because a device is authenticated using a different method based on the input/output function of a device.

Effects which may be obtained in this specification are not limited to the above-described effects, and other technical effects not described above may be evidently understood by a person having ordinary skill in the art to which the present invention pertains from the following description.

DESCRIPTION OF DRAWINGS

FIGS. 7 and 8 illustrate examples of an authentication method to which methods according to the present invention may be applied.

FIG. 12 shows an example of the fields of a UAS feature Get message and a UAS Feature message and information of each field.

FIG. 16 shows an example of the fields of a Start message and information of each field.

FIG. 17 shows an example of the fields of a Server Hash Commit message and information of each field.

FIG. 18 shows an example of the fields of a client public key message and information of each field.

FIG. 19 shows an example of the fields of a server public key message and information of each field.

FIG. 20 shows an example of the fields of a Client Confirmation message and Abort message and information of each field.

MODE FOR INVENTION

Figure 1:
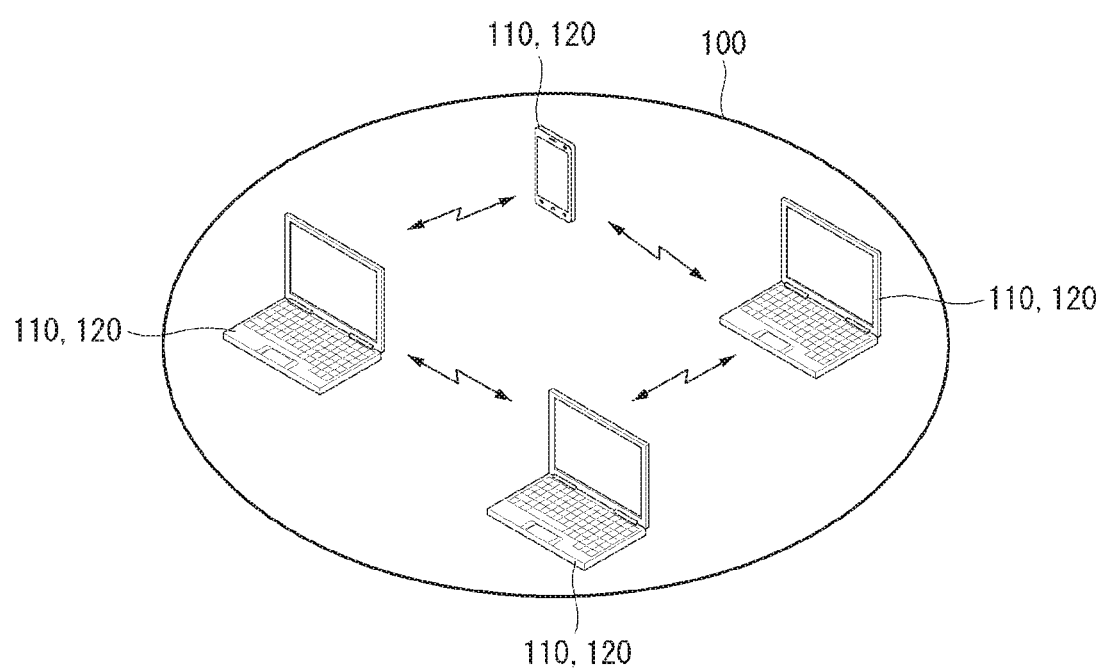
FIG. 1 shows an example of a wireless communication system using a BLE technology according to an embodiment of the present invention.

The above objects, characteristics, and merits of the present invention will become more apparent from the following detailed description taken in conjunction with the accompanying drawings. The present invention may be modified in various ways and may have some embodiments. Hereinafter, specific embodiments of the present invention will be illustrated in the accompanying drawings and described in detail. The same reference numerals basically designate the same elements throughout the drawings. Furthermore, a detailed description of related known functions or elements will be omitted if it is deemed to make the gist of the present invention unnecessarily vague. Furthermore, it is to be noted that the accompanying drawings are provided to only help easily understand the spirit of the present invention and the spirit of the present invention is limited by the accompanying drawings.

Hereinafter, methods and devices related to the present invention are described more specifically with reference to the drawings. Furthermore, common terms used in the present invention should be interpreted in accordance with the definition of dictionaries or in accordance with the context, and should not be construed as having excessively reduced meanings. Furthermore, an expression of the singular number used in this specification includes an expression of the plural number unless clearly defined otherwise in the context. In this application, terms, such as "include" and "comprise", should not be construed as essentially including all various elements or various steps described in the specification, but the terms may be construed as not including some of the elements or steps or as including additional elements or steps. It is to be noted that the suffixes of elements used in this specification, such as a "module" and a "unit," are assigned or interchangeable with each other by taking only the ease of writing this specification into consideration, but themselves are not given particular importance and roles.

FIG. 1 is a schematic diagram illustrating an example of a wireless communication system using Bluetooth low energy technology proposed in the specification.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The servicer device 120 may be termed alternatively as a data service device, slave device, slave, server, conductor, host device, gateway, sensing device, monitoring device, first device, or second device.

The client device 110 may be termed alternatively as a master device, master, client, member, sensor device, sink device, collector, third device, or fourth device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
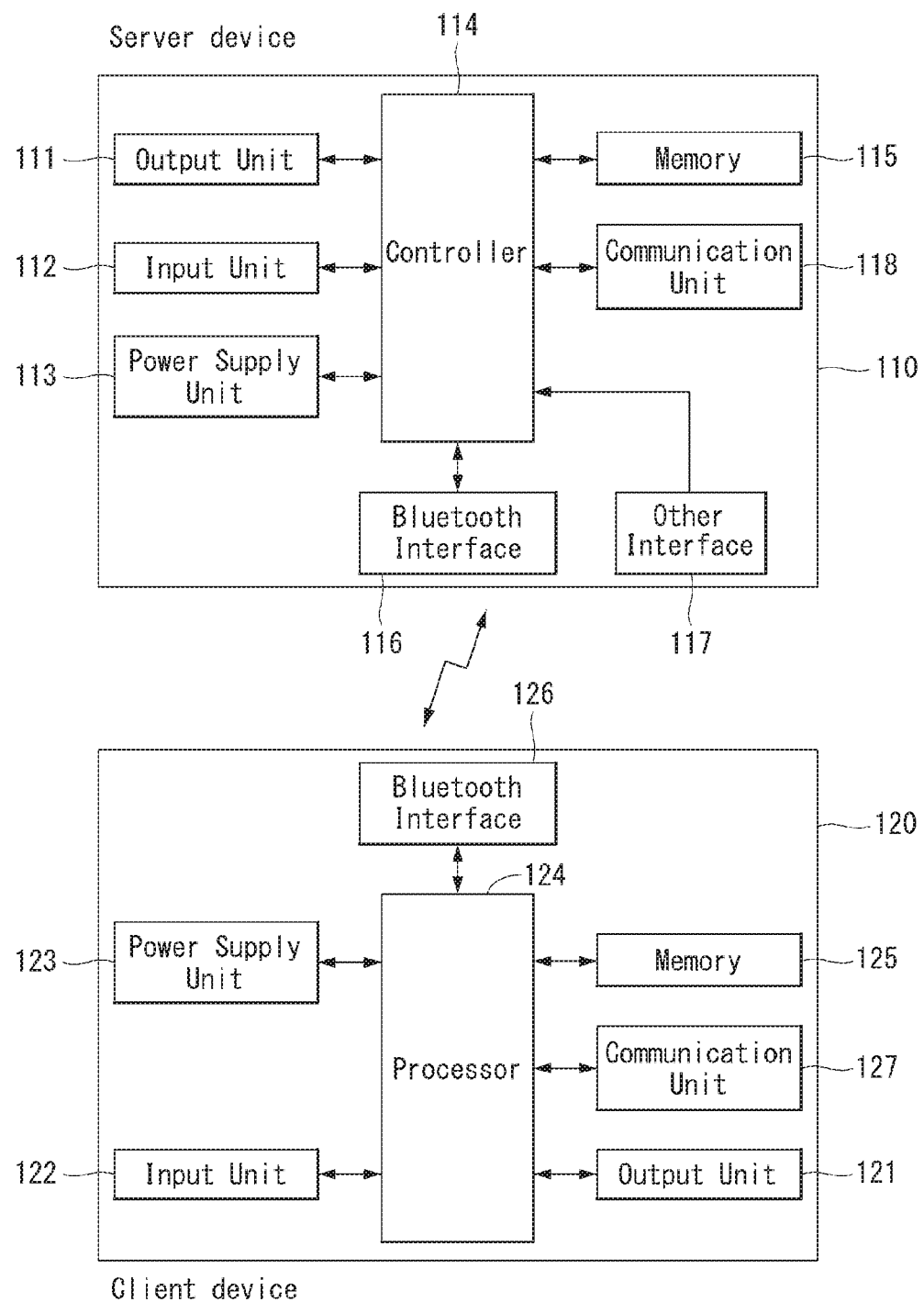
FIG. 2 shows an example of an internal block diagram of a server device and a client device capable of implementing methods according to embodiments of the present invention.

FIG. 2 is a block diagram of a device capable of realizing methods proposed in the specification.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules which receive external power and internal power and provide power necessary for operation of components under the control of the processor.

As described above, BLE technology has a small duty cycle and can remarkably reduce power consumption through a low data rate.

The input units 112 and 122 refer to modules which provide user input through a screen button, for example, to the controller such that the user can control device operation.

Figure 3:
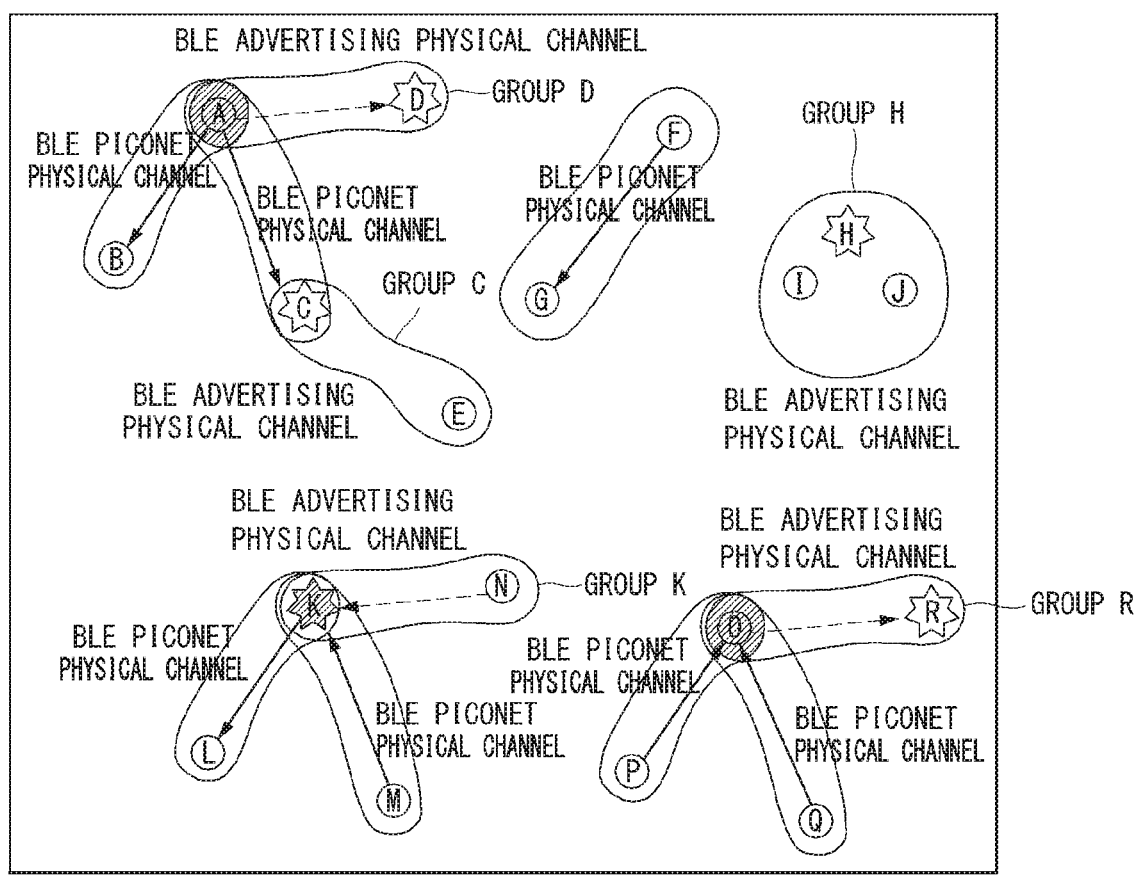
FIG. 3 shows an example of a BLE network topology.

FIG. 3 shows an example of a BLE network topology.

Referring to FIG. 3, a device A corresponds to a piconet (piconet A, the shaded area) master having a device B and a device C as slaves.

In this case, a piconet refers to a set of devices in which one of a plurality of devices functions as a master and the others occupy a shared physical channel connected to the master device.

A BLE slave does not share a common physical channel with a master. Each slave communicates with a master through a separate physical channel. There is another piconet (piconet F) including a master device F and a slave device G.

A device K belongs to a scatternet K. In this case, the scatternet refers to a group of piconets interconnected to each other.

A device K is the master of a device L and also a slave of a device M.

A device O also belongs to a scatternet O. The device O is a slave of a device P and also a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In the group D, the device D performs advertising using an advertisement event which may be connected to an advertising physical channel, and the device A is an initiator. The device A may establish a connection to the device D and add a device to the piconet A.

In the group C, the device C performs advertising through an advertising physical channel using a certain type of an advertisement event captured by the scanner device E.

The group D and the group C may use different advertising physical channels or different time frames so as to avoid a collision.

The piconet F has one physical channel. The device F and the device G use a single BLE piconet physical channel. The device F is a master, and the device G is a slave.

The group H has one physical channel. The devices H, I, and J use one BLE advertising physical channel. The device H is an advertiser, and the devices I and J are scanners.

In the scatternet K, the devices K and L use a single BLE piconet physical channel. The devices K and M use another BLE piconet physical channel.

In the group K, the device K performs advertising using an advertisement event which may be connected to an advertising physical channel, and the device N is an initiator. The device N may establish a connection with the device K. In this case, the device K functions as a slave of two devices and also as a master of one device.

In the scatternet O, the devices O and P use a single BLE piconet physical channel. The devices O and Q use different BLE piconet physical channels.

In the group R, the device R performs advertising using an advertisement event which may be connected to an advertising physical channel, and the device O is an initiator. The device O may establish a connection with the device R. In this case, the device O functions as a slave of two devices and also a master of one device.

Figure 4:
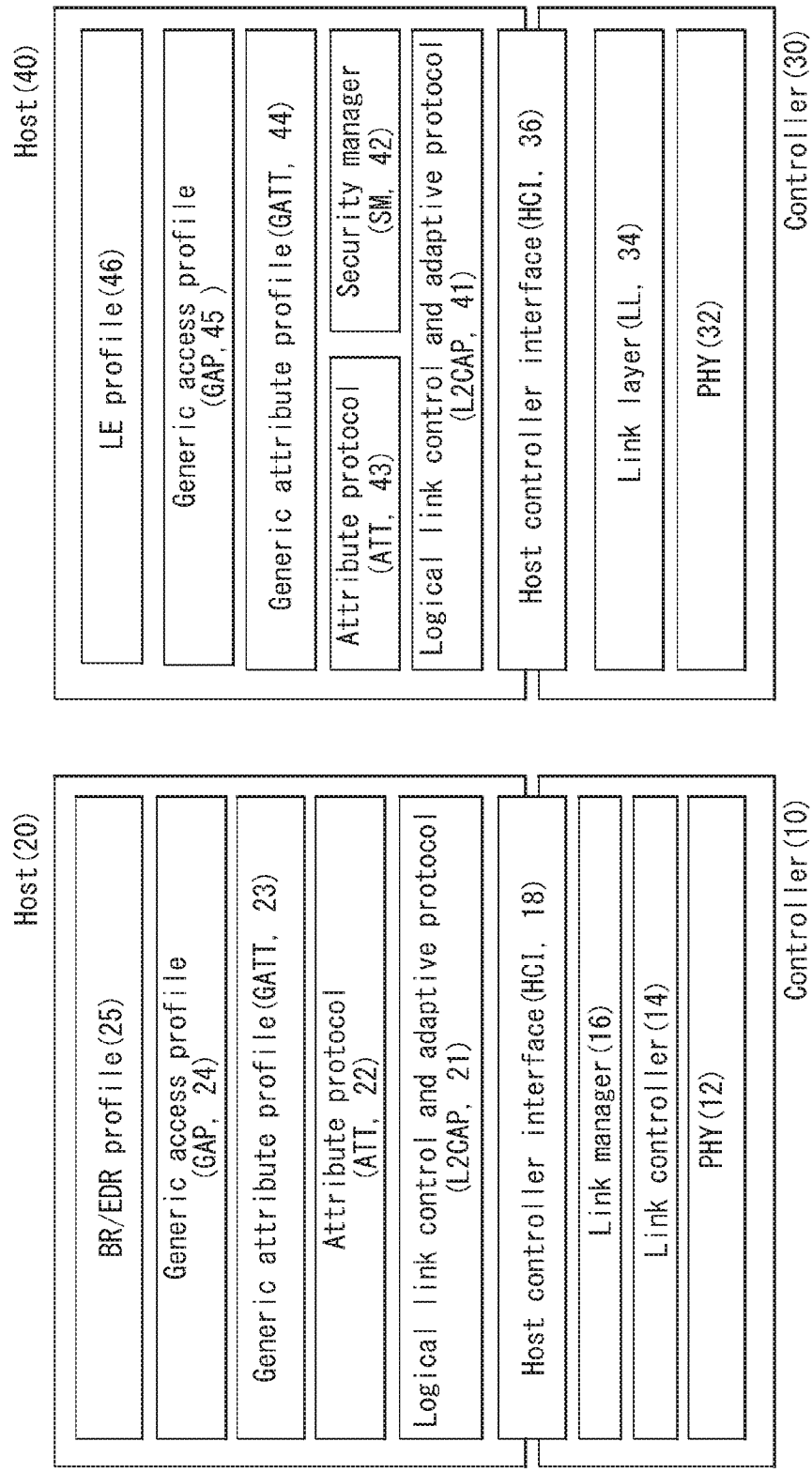
FIG. 4 illustrates one example of Bluetooth communication architecture to which methods according to the present invention may be applied.

FIG. 4 illustrates an example of a Bluetooth communication architecture to which methods proposed in this specification are applicable.

Referring to FIG. 4, FIG. 4(a) illustrates an example of a Bluetooth BR (Basic Rate)/EDR (Enhanced Data Rate) protocol stack and FIG. 4(b) illustrates an example of a Bluetooth LE (Low Energy) protocol stack.

Specifically, as illustrated in FIG. 4(a), the Bluetooth BR/EDR protocol stack may include a controller stack 10 and a host stack 20 above and below a host controller interface (HCI) 18.

The host stack (or host module) 20 refers to hardware for transmitting or receiving Bluetooth packets to or from a wireless transceiver module receiving 2.4 GHz Bluetooth signals and is connected to the Bluetooth module corresponding to the controller stack 10 to control the Bluetooth module and perform operations.

The controller stack 10 may include a PHY layer 12, a link controller layer 14 and a link manager layer 16.

The PHY layer 12 transmits and receives 2.4 GHz radio signals and can hop 79 RF channels and transmit data when GFSK (Gaussian Frequency Shift Keying) modulation is used.

The link controller layer 14 serves to transmit digital signals, selects a channel sequence hopping 1400 times per second and transmits a 625 μs time slot per channel.

The link manager layer 16 controls overall operations (link setup, control and security) of Bluetooth connection using LMP (Link Manager Protocol).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in FIG. 4(b), the Bluetooth LE protocol stack includes a controller stack 30 operable to process a wireless device interface for which timing is important and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The present invention may transmit a data length value from the GATT profile employing the attribute protocol (ATT) 43 upon a request of long data, allowing the client device to know the exact data length and receive a characteristic value from the service device by using the UUID.

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

A description will be given of procedures of the BLE technology.

The BLE procedures may be classified into a device filtering procedure, an advertising procedure, a scanning procedure, a discovery procedure and a connection procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement, and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
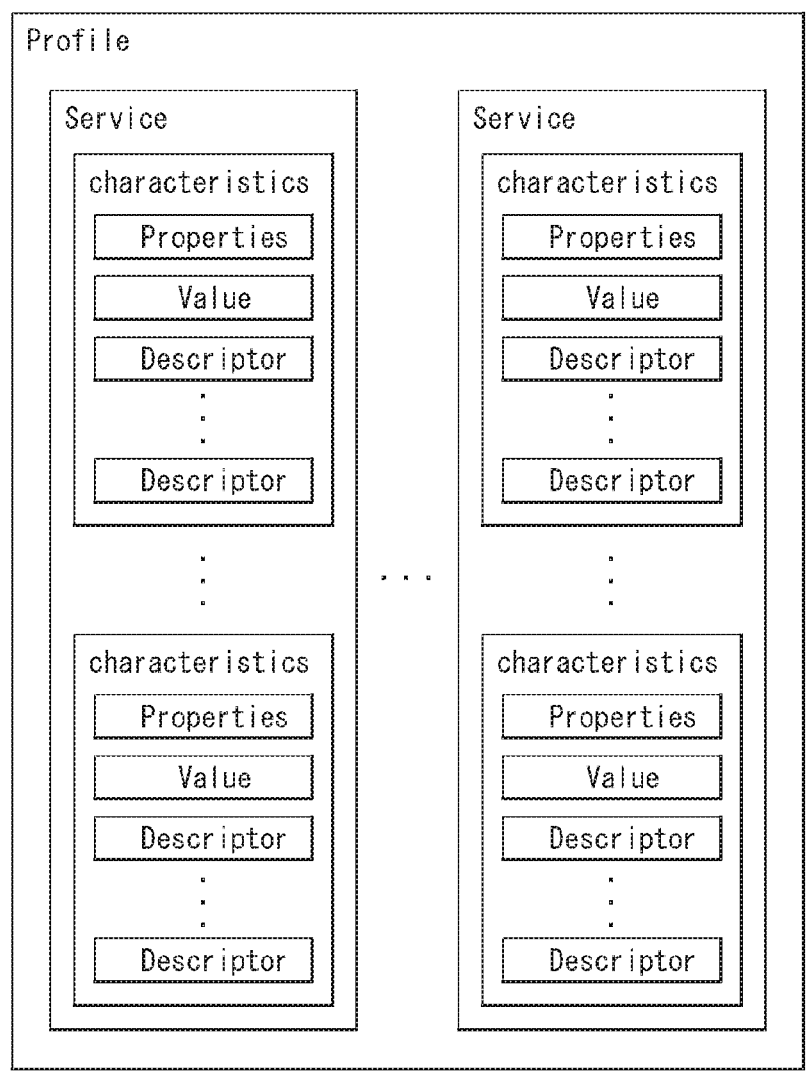
FIG. 5 shows an example of the GATT Profile structure of the BLE specification.

FIG. 5 illustrates an example of a structure of a GATT (Generic Attribute Profile) of Bluetooth low energy.

Referring to FIG. 5, the structure for exchange of Profile Data of Bluetooth Low Energy will be described.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

Figure 6:
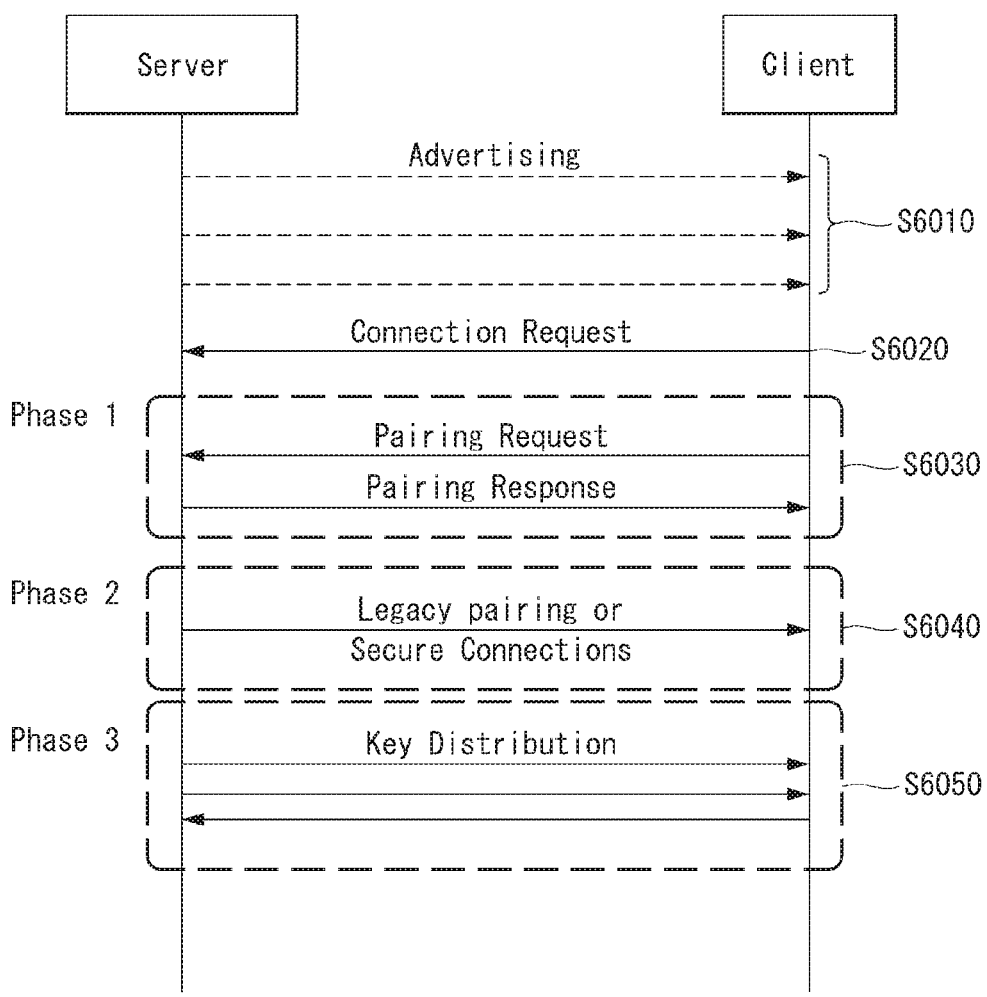
FIG. 6 shows an example of a method for the connection procedure of the BLE specification.

The attribute has four components and has meanings as follows.

handle: Address of attribute
Type: Type of attribute
Value: Value of attribute
Permission: Right to access attribute FIG. 6 shows an example of a method for the connection procedure of the BLE specification.

A server sends an advertisement message through three advertisement channels (S6010).

The server may be called an advertiser before a connection is established and may be called a master after the connection is established. Examples of the server include sensors (e.g., temperature sensors).

Furthermore, the client may be called a scanner before a connection is established and may be called a slave after the connection is established. The client may be a smart phone, for example.

As described above, Bluetooth communication uses a total of 40 channels through a frequency of 2.4 GHz. Three of the 40 channels are advertisement channels, which are used for exchanging packets to establish a connection in addition to various advertising packets.

The remaining 37 channels are data channels which are used for the exchange of data packets after a connection is established.

After receiving the advertisement message, the client may send a scan request to the server in order to obtain additional data (e.g., a server device name) from the server.

The server sends a scan response message, together with the remaining data, to the client in response to the scan request message.

In this case, the scan request message and the scan response message are one type of an advertisement packet which may include only user data of 31 bytes or less.

Therefore, if a data size is larger than 31 bytes, but with large overhead from established connection to send data, the data is divided into two blocks and transmitted twice using the scan request/scan response.

Next, the client sends, to the server, a connection request message for establishing BLE with the server (S6020).

Accordingly, a link layer (LL) connection is established between the server and the client.

Thereafter, the server and the client perform a security establishment procedure.

The security establishment procedure may be construed as secure simple pairing or may be performed with the secure simple pairing being included therein.

In other words, the security establishment procedure may be performed through a phase 1 to a phase 3.

More specifically, a pairing procedure (i.e., the phase 1) is performed between the server and the client (S6030).

Through the pairing procedure, the client sends a pairing request message to the server, and the server sends a pairing response message to the client.

Through the pairing procedure, the authentication requirements, input/output capabilities (I/O capabilities) and the key size information are exchanged between the devices. This information is used to determine which key generation method to use in Phase 2.

In the phase 2, a legacy pairing or secure connection is performed between the server and the client (S6040).

In Phase 2, a 128-bit temporary key and a short term key (STK) for performing legacy pairing are generated.

Temporary Key: Key generated to create STK

Short Term Key (STK): A key value used to make an encrypted connection between devices A 128 bit Long Term Key (LTK) is generated when a secure connection is established in Phase 2.

Long Term Key (LTK): Key value used in future connection as well as encrypted connection between devices the SSP phase 3, a key distribution procedure is performed between the server and the client (S6050).

Through the phases, a secure connection is established between the server and the client, and encrypted data may be transmitted and received.

Secure Simple Pairing

Secure simple pairing providing a convenient pairing procedure for the user and is performed for the purpose of reinforcing security against passive eavesdropping and MITM (Man-In-The-Middle) attack.

The secure simple pairing consists of the following four stages.

IO capability exchange
Public key exchange
Authentication stage 1
Authentication stage 2

First, devices exchange IO capabilities to determine an algorithm relevant to secure simple pairing.

To this purpose, an initiator transmits to a responder an IO capability request message requesting IO capability, and the responder transmits an IO capability response message in response to the request.

The initiator and the responder exchange their IO capabilities at the IO capability exchange stage.

After exchanging IO capabilities, two devices exchange public keys.

If the length of a public key is longer than that of payload body of the DM1 packet, the public key may be exchanged by exchanging messages multiple times At the public key exchange stage, two devices may exchange DH (Diffie-Hellman) keys which are symmetric keys of 192 or 256 bit length.

Afterwards, at the authentication stage 1, whether an MITM attach has occurred is checked.

To check the occurrence, secure simple pairing uses three methods of Just Work, Passkey Entry, and Numeric Comparison according to input/output capabilities of devices as shown in Table 2 below.

TABLE 2

| Device Attribute | Display Only | Display & Input | Keyboard Only | No Input No Output |
|---|---|---|---|---|
| Display Only | Numeric Comparison | Numeric Comparison | Passkey Entry: | Just Works |
| Display & Input | Numeric Comparison | Numeric Comparison | Passkey Entry: | Just Works |
| Keyboard Only | Passkey Entry: | Passkey Entry: | Passkey Entry: | Just Works |
| No Input No Output | Just Works | Just Works | Just Works | Just Works |

Numeric Comparison: it is used when both of the two devices are equipped with a display device on which a six digit number may be displayed, and an input device by which "yes" or "no" may be selected is employed.

Just Works: it is used when at least one of the two devices does not have a device on which a six digit number may be displayed, and the other device does not have an input device through which a six digit number may be entered.

Passkey Entry: it is used when one of the two devices does not have a display device on which a six digit number may be displayed but has an input device while the other device is equipped with a display device on which a six digit number may be shown.

Out of Band: it is used when the out-of-mechanism (for example, NFC) capable of searching for a remote device and supporting exchange of cryptographic numbers to be used in a pairing process is used.

After the Authentication stage 1, a cryptographic channel is created by checking the DHKey through the Authentication stage 2 and through a link key generation procedure.

Figure 7:
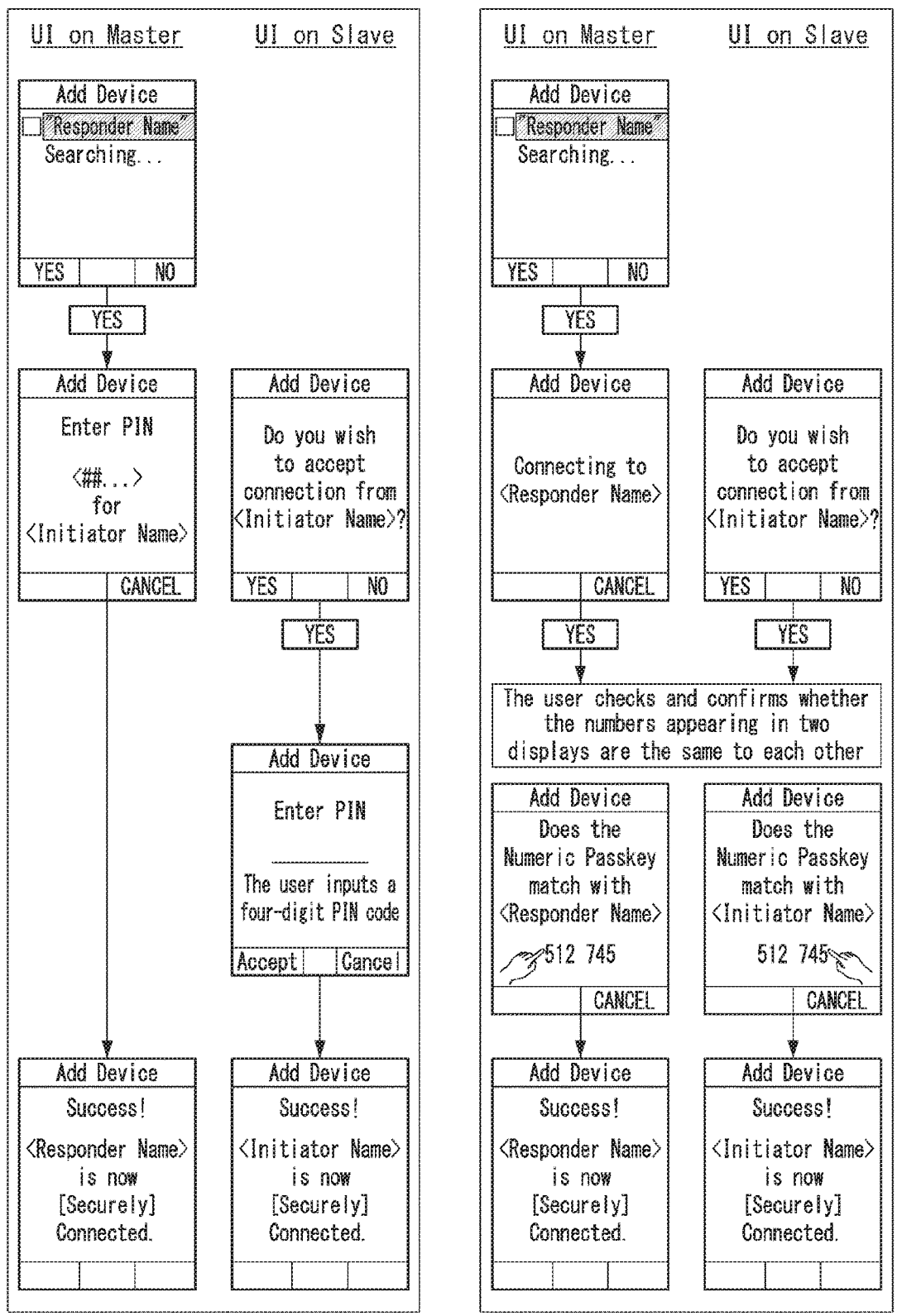

FIGS. 7 and 8 illustrate examples of an authentication method to which methods according to the present invention may be applied.

FIG. 7(a) illustrates one example of legacy pairing, and (b) illustrates one example of numeric comparison.

FIG. 8(a) illustrates one example of Just Work, and (b) illustrates one example of Passkey Entry.

As shown in FIG. 7(a), in the case of legacy pairing, pairing is performed by providing a PIN code output through the output unit (for example, display unit) of a master device to a slave device.

In the case of Numeric Comparison, as shown in FIG. 7(b), device authentication is done by checking whether the numbers displayed on the master and slave devices are the same and confirming the devices when they are the same.

Just Work is a method that may be used for a device that does not have a display device; as shown in FIG. 8(a), a master device is connected to a slave device according to a request from the master device, and the slave device displays to the outside through the output unit that the connection has been successfully established.

In the case of Passkey Entry, as shown in FIG. 8(b), if a specific Passkey is displayed on the master device, and the displayed Passkey is input through the slave device, the master and slave devices are connected to each other.

To transmit and receive data by using Bluetooth communication, a Bluetooth device has to search for another Bluetooth device and establish a connection to the device.

At this time, in the process of forming a connection, two devices are required to authenticate each other and grant rights of use as described above. In the authentication process, the aforementioned methods such as Legacy Pairing, Numeric Comparison, and Passkey Entry may make the user go through an inconvenient, difficult process due to a predefined password or multiple logins.

Also, even if authentication is done in the link layer, additional authentication is required in the profile since authentication and authorization to use a specific service is not granted.

Therefore, to solve the problem above, the present invention proposes a method for authentication in a specific profile, which may be recognized intuitively by a user according to an input/output function of a device.

Hereinafter, in description regarding a drawing showing a flowchart in descriptions regarding the drawings, a detailed description of the same procedure as a procedure included in a flowchart that is first described is omitted in the description of a subsequent figure. For detailed description of the same procedure, reference is made to the description of a previous figure.

Hereinafter, a client may be referred to as a UA client, and a server may be referred to as a UA server.

Figure 9:
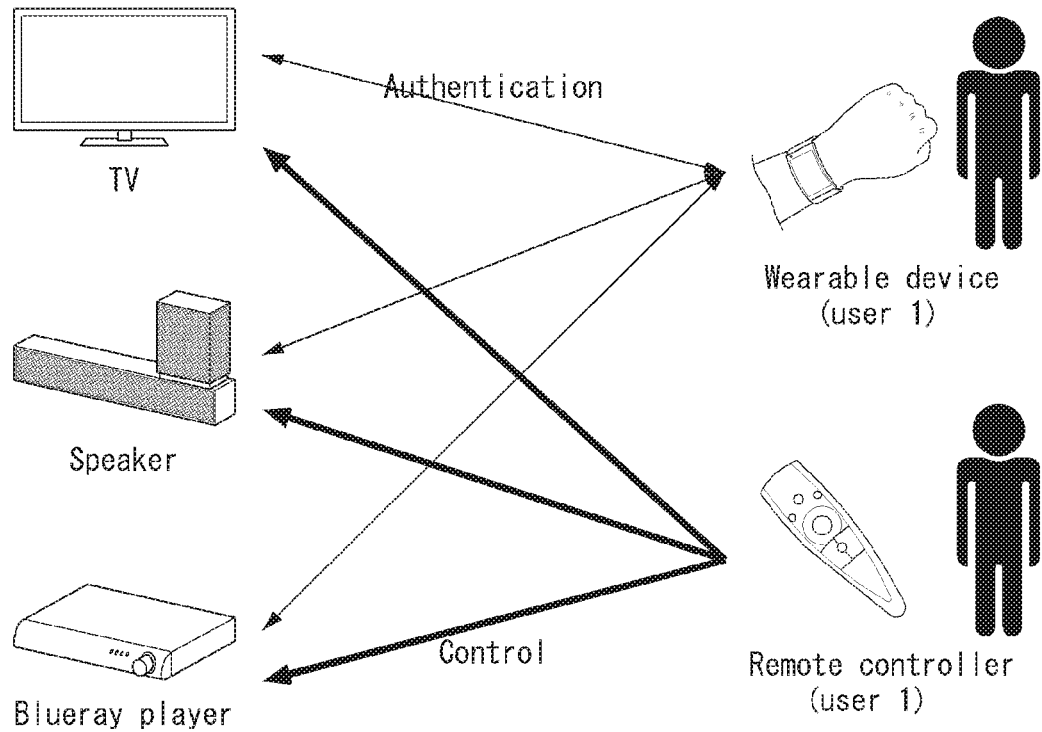
FIG. 9 shows an example of a method of authenticating and controlling a plurality of Bluetooth devices.

FIG. 9 shows an example of a method of authenticating and controlling a plurality of Bluetooth devices.

A user may own a plurality of Bluetooth devices. The Bluetooth devices include a wearable device, a smart device or a device controlled by an external controller (e.g., a remote controller). The Bluetooth device may include a display based on the type or function.

FIG. 9 shows an example in which a user forms Bluetooth connections in a plurality of devices, respectively. For example, the user needs to perform authentication between one or more Bluetooth devices controlled by an external controller and between wearable devices owned by a user. In this case, the user needs to perform a plurality of pieces of authentication in order to authenticate all devices, respectively. Different authentication information may be used in the plurality of authentication procedures. For example, if authentication is performed using a password, a user must separately memorize all passwords necessary for the authentication of respective devices. Furthermore, in the case of a Bluetooth device controlled by an external controller, a separate manipulation/control is necessary.

Such a conventional authentication method causes inconvenience in a Bluetooth connection and use with respect to people (e.g., a senior citizen and a handicapped person) who have a difficulty in using or manipulating a device. In order to solve such inconvenience, there is a need for an authentication method having enhanced user convenience. This is described in detail below.

Figure 10:
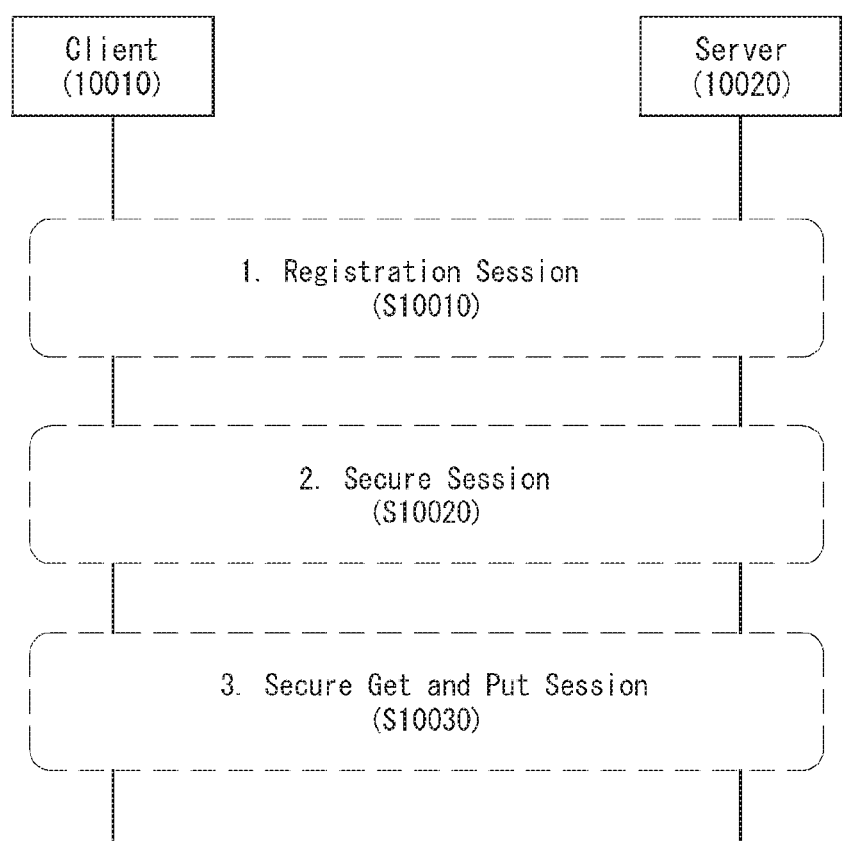
FIG. 10 shows an example of a procedure for authentication between devices in the user authentication service of a Bluetooth low energy technology.

FIG. 10 shows an example of a procedure for authentication between devices in the user authentication service of a Bluetooth low energy technology.

Hereinafter, a device refers to a device capable of performing Bluetooth communication.

A user authentication service (hereinafter represented as a "UAS", for convenience sake) is a service for automatically performing authentication using one device with respect to other devices. For example, one device may correspond to a wearable device, and the other device may correspond to a notebook, a mobile phone, a tablet or a printer. That is, the UAS is a user authentication service that notifies a device to be used of a user who uses user an authentication (UA) server by wearing a wearable device.

In the UAS procedure, three procedures may be performed for authentication between devices. The three procedures include a registration session, a secure session, and a Secure Get and Put session.

A client 10010 and a server 10020 perform a registration session procedure of registering mutual information between devices (S10010). The registration session procedure includes the notification procedure of an authentication method, a hash value generation procedure, a public key exchange procedure and a registration ID generation procedure.

The client 10010 and the server 10020 perform a secure session procedure for generating an encrypted link (S10020). The client 10010 and the server 10020 may generate a secure link using a registration ID, transmitted in the registration session procedure, before they exchange information between devices.

After the secure link is generated in the secure session procedure, the client 10010 and the server 10020 perform a Secure Get and Put session procedure of exchanging token information between devices (S10030).

Figure 11:
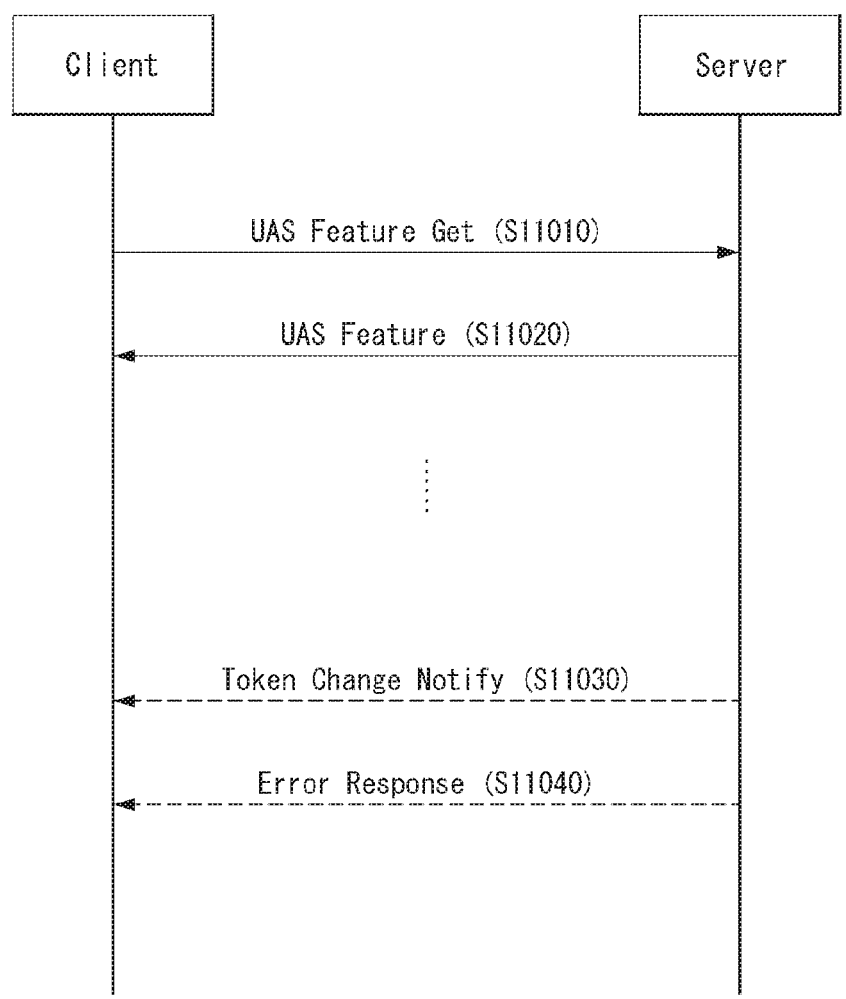
FIG. 11 shows an example of a flowchart including a procedure of transmitting and receiving messages, including the UAS feature of a server, by a client and the server.

FIG. 11 shows an example of a flowchart including a procedure of transmitting and receiving messages, including the UAS feature of a server, by a client and the server.

The UAS includes a UAS feature characteristic. The UAS feature characteristic enables the function of a UA server to be known before a UA client performs a registration session procedure.

A client transmits a Characteristic Read Request message to request the UAS feature characteristic of a server to the server (S11010). The message may be referred to as a UAS Feature Get message.

After receiving the UAS Feature Get message, the server transmits a Characteristic Read Response message, including the UAS feature characteristic of the server, as a response thereto (S11020). The message may be referred to as a UAS Feature message. The client may determine a feature supported by the server based on the received UAS Feature message.

Furthermore, the server may transmit a Characteristic Notification message, including information on a changed token, to the client (S11030). The message may be referred to as a Token Change Notify message. The client may update token information based on the received Token Change Notify message.

When an error occurs in an authentication process, the server may transmit 로 an Error Response message to the client (S11040).

FIG. 12 shows an example of the fields of a UAS feature Get message and a UAS Feature message and information of each field.

(a) shows the fields of the UAS Feature Get message and information of each field, and (b) shows the fields of the UAS Feature message and information of each field.

A UAS server shown in FIG. 12 corresponds to a UA server.

The UAS Feature Get message includes a Message Type field indicating the type of the corresponding message. The Message Type field is set as UAS Feature Get.

Requirements indicate whether the corresponding field is mandatory in the message. M indicates that the corresponding field is mandatory.

The UAS Feature message may include a Message Type field, a UAS Version field, a Registration ID Count field, a Token Count field, a Factor Type List field, a UA Server ID field and a Max Clock Drift Rate field.

A feature flag supports MACed Server-Issued Tokens. The feature flag generates a MAC value using a token, generated by a UA server, and a session key. A UA client performs authentication the same session key.

The feature flag supports a Token Lookup based on a Factor Type. A UA client transmits a Token Value message of Secure Get in a secure session. Thereafter, a UA server transmits a Token Value Response message of Secure Get. The UA client confirms whether the tokens are identical.

The feature flag supports SAS verified LTK. A short authentication string (SAS) may be identified by a user using the I/O display of a UA server. The SAS may correspond to a combination of English letters and numbers of four digits or more.

The feature flag supports a set time. The feature flag may perform a registration session by differently setting a set time in each registration ID of a UA client.

The feature flag supports distance bounding. A token may be generated using a fixed distance value between a client and a server, measured as RSSI.

The Registration ID Count is the number of registered clients initiated by a server. If the number of supportable Reg IDs is a maximum, a UA server may transmit an error message to a UA client using Registration ID Count information.

The Max Clock Drift Rate corresponds to a Maximum clock drift rate of a UA server. A Clock Drift is a phenomenon occurring because a clock does not operate at accurate speed.

The name, size or format of each field may be changed.

Figure 13:
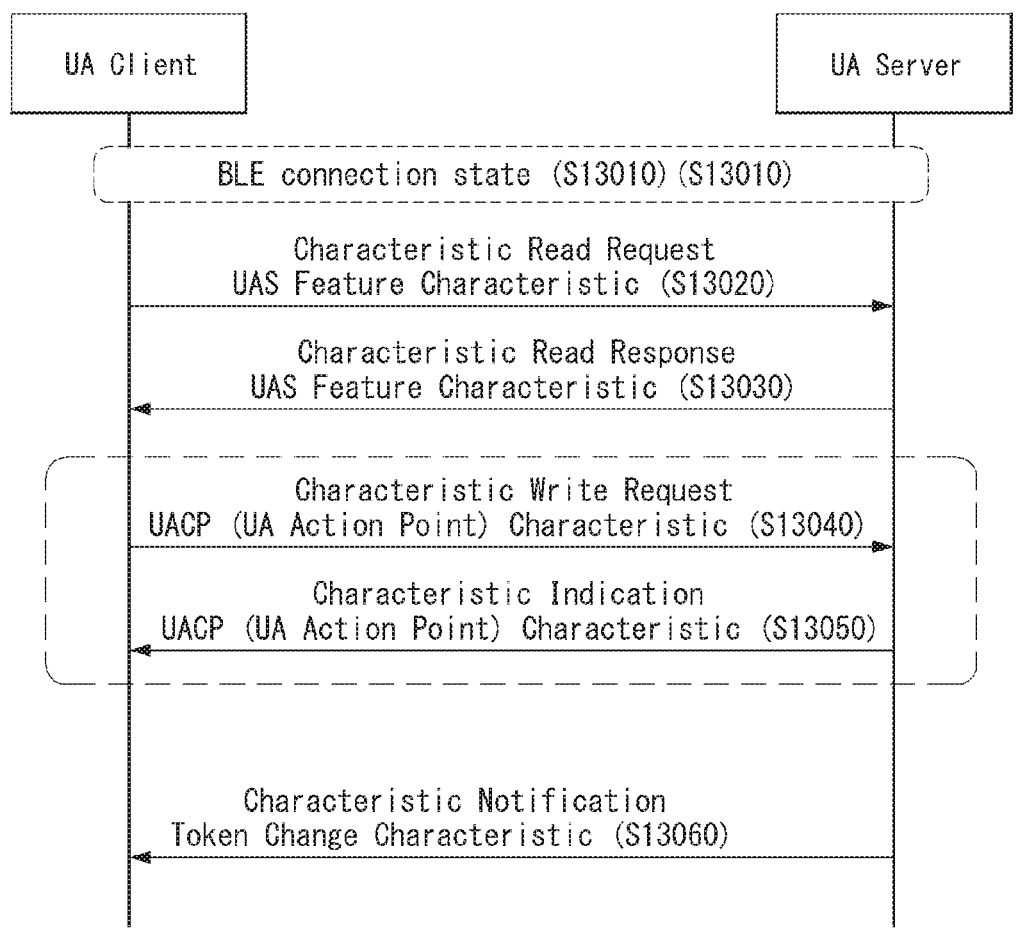
FIG. 13 shows an example of a flowchart a user authentication service protocol procedure.

FIG. 13 shows an example of a flowchart a user authentication service protocol procedure.

First, a server and a client form a BLE Connection State before they start a registration session procedure (S13010).

Thereafter, the client requests UAS Feature Characteristic information of the server from the UA server (S13020), and receives the UAS Feature Characteristic information from the server (S13030). The server may transmit a notification message, including information on a changed token, to the client (S13060). The three procedures may be performed identically with the UAS Feature Get message transmission (S11010), UAS Feature message transmission (S11020) and Token Change Notify message transmission (S11030) procedures described in the description related to FIG. 11.

After receiving the UAS Feature information, the client transmits a Write Request message, related to specific procedure of the client, to the server (S13040). The message may be referred to as a UA Action Control Point (UACP) Characteristic Write message.

The UAS includes a User Authentication (UA) Action Control Point characteristic. The UA Action Control Point characteristic enables a UA client to initiate a specific operation by a UA server.

The server transmits a Characteristic Indication message, including the UA action control point (UACP) characteristic information, as a response to the User Authentication (UA) Action Control Point characteristic request (S13050). The message may be referred to as a UA Action Control Point Characteristic Indication message.

Table 3 shows Op Codes of the USCP Characteristic Write message and the UACP Characteristic Indication message. The type of message is determined based on Op code included in UACP characteristic information.

TABLE 3

| Op Code Value | Definition |
| --- | --- |
| 0x00 | Registration Start |
| 0x01 | Registration Client Public Key |
| 0x02 | Registration Confirmation |
| 0x03 | Registration Abort |
| 0x04 | Secure Get Token Value |
| 0x05 | Secure Get All Token Value |
| 0x06 | Secure Add/Update Token |
| 0x07 | Secure Delete Token |
| 0x08 | Secure Unregister ID |
| 0x09 | Secure Set Time |
| 0x0A | Secure Set Distance Bounding |
| 0x0B-0xFE | RFU |
| 0xFF | Response |

The Registration Start (0x00) message initiates a procedure of requesting control of user authentication. The Registration Client Public Key (0x01) message starts a procedure of providing the public key of a UA client. The Registration confirmation (0x02) message starts a procedure of confirming a registration session between a UA client and a UA server. The Registration Abort (0x03) message starts a procedure of terminating a registration procedure. The Secure Get token value (0x04) message starts a procedure of fetching one token for a secure session. The Secure Get All Token Value (0x05) message starts a procedure of fetching all tokens stored in a UA server in a secure session. The Secure Add/Update Token (0x06) message starts a procedure of adding or updating a token in a UA server. The Secure Delete Token (0x07) message starts a procedure of deleting a token in a UA server. The Secure Unregister ID (0x08) message starts a procedure of notifying a UA server of an unregister ID. In this case, information related to the unregister ID must be deleted from the UA server. The Secure Set Time (0x09) message starts a procedure of preventing a secure attack against the timestamps of another user ID. The Secure Set Distance Bounding (0x0A) message starts a procedure of setting the distance defined between a UA server and a UA client. The Response message is transmitted to a UA client in response to the indication of a UACP characteristic.

Figure 14:
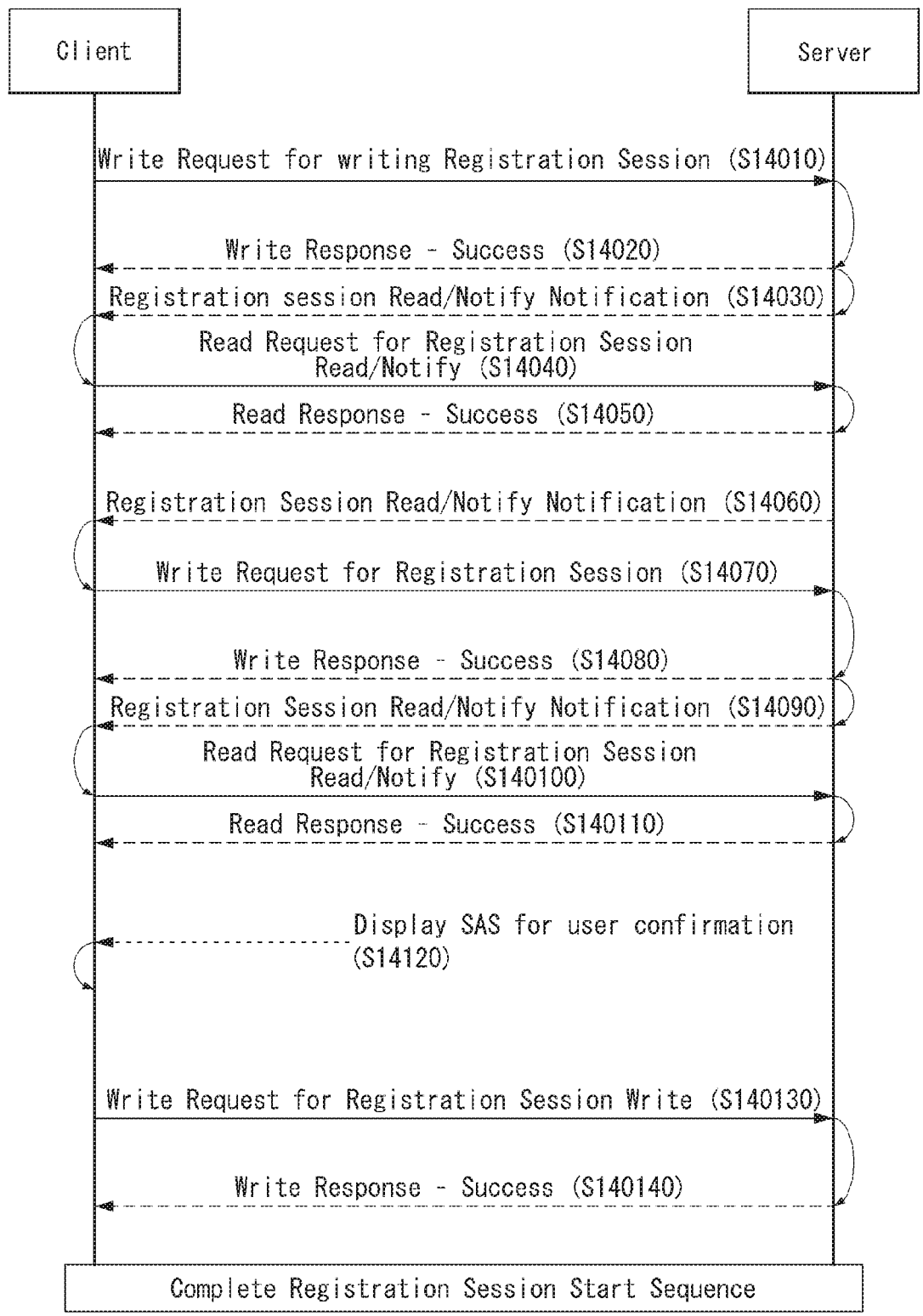
FIG. 14 shows an example of a flowchart a Registration Session Start Sequence.

FIG. 14 shows an example of a flowchart a Registration Session Start Sequence.

A client transmits a Write Request message for initiating a registration session to a server (S14010). The message may be referred to as a Start message. The Start message includes Start Registration, a Registration Request Number, and a Registration Message. The server may transmit a corresponding response message to the client (S14020).

Thereafter, the server may transmit a Notification massage, including Server Hash Commit, to the client (S14030). The message may be referred to as a Server Hash Commit message.

After receiving the Server Hash Commit message, the client transmits a Read Request For Registration Session Read/Notify message, that is, a request message, to the server (S14040). The server may transmit a Read Response message to the client as a response thereto (S14050). The Read Response message includes Server Hash Commit, H(KS_PUB), a User Interaction Type, and User Interaction Data.

The User Interaction Type and the User Interaction Data are described later.

The client receives the Read Response message including H(KS_PUB), and stores H(KS_PUB) for verification in a later step. Furthermore, the client displays an interaction message required for a user and waits for the confirmation of the user.

When the user completes an interaction required for user authentication in a server device, the server may transmit a notification message, including whether the user interaction is successful, to the client (S14060). The message may be referred to as a User Interaction Complete message. The user interaction is described later.

After receiving the results of the client user interaction, the client transmits a Write Request message, including the public key of the client, to the server (S14070). The Write Request message includes a client public key, KCX_PUB, KCY_PUB, N_c, and User Interaction Data. The message may be referred to as a client public key message. After receiving the Write Request message, the server generates LTK using the KCX_PUB, KCY_PUB. KS_PRIV for a later step, and stores N_c. Thereafter, the server may transmit a Write Response message to the client (S14080).

The client waits for the completion of the LTK generation of the server. Thereafter, the client may receive a Registration Session Read/Notify message to provide notification of LTK Generation Complete from the server (S14090). The client may obtain LTK from the message.

Thereafter, the server receives a Read Request For Registration Session Read/Notify message, that is, a request message, from the client (S140100), and generates a MAC key for KS_PUB.

Thereafter, the server may transmit a Read Response message, including a server public key, KSX_PUB, KSY_PUB, a registration ID, N_s, and MAC_s, to the client (S140110). The message may be referred to as a server public key message.

If SAS confirmation is required, the server may transmit a message, indicating that SAS has been displayed on the server device, to the client for user confirmation (S140120). Thereafter, the user verifies the SAS from the display of the UA server device.

The client verifies SAS Confirmation, H(KS_PUB) and MAC_s and generates LTK and MAC_c. The client transmits a Write Request message, including Client Confirmation and MAC_c, to the server (S140130). The message may be referred to as a Client Confirmation message. The Client Confirmation message indicates that device registration has been completed.

The server verifies the received MAC_c and stores the registered ID and LTK in a database. Thereafter, the server may transmit a Write Response message to the client (S140140). The client that has received the Write Response message stores the registered ID and LTK in the database. The message may be referred to as a Client Confirmation Reply message.

A Registration Session Start Sequence is completed through the above-described procedure. The UA client may start a secure session and generates its own token.

Figure 15:
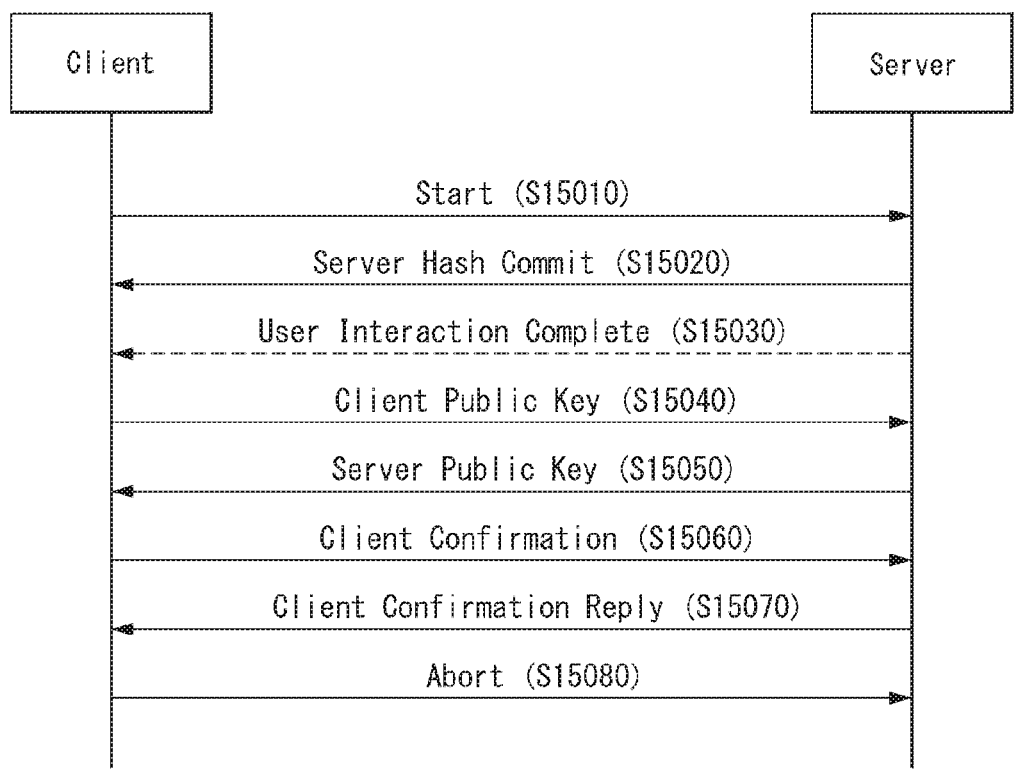
FIG. 15 shows an example of a flowchart, in brief, showing a Registration Session Start Sequence flowchart disclosed in FIG. 14.

FIG. 15 shows an example of a flowchart, in brief, showing a Registration Session Start Sequence flowchart disclosed in FIG. 14.

A client transmits a Start message to request the authentication start to a server (S15010). This procedure may be performed identically with step S14010 of FIG. 14.

The server transmits a message, including Server Hash Commit, to the client (S15020). This procedure may be performed identically with step S14030 of FIG. 14.

The server may transmit a message, indicating User Interaction Complete, to the client (S15030). This procedure may be performed identically with step S14060 of FIG. 14.

The client transmits a message, including a client public key, to the server (S15040). This procedure may be performed identically with step S14070 of FIG. 14.

Thereafter, the server transmits a message, including a server public key, to the client (S15050). This procedure may be performed identically with step S140110 of FIG. 14.

The client transmits a Client Confirmation message (S15060). This procedure may be performed identically with step S140130 of FIG. 14.

The server transmits a client Confirmation Reply message to the client as a response to the Client Confirmation message (S15070). This procedure may be performed identically with step S140140 of FIG. 14.

The client may transmit an Abort message, that is, a message to terminate the registration session procedure, to the server (S15010). Furthermore, the Abort message may be transmitted when an error defined in UAS occurs in a registration session procedure. Accordingly, the registration session procedure may be aborted.

For the details of each message transmission procedure, reference is made to the description related to FIG. 14. Fields included in the message used in each procedure are described later.

FIG. 16 shows an example of the fields of a Start message and information of each field.

A Start message includes a Registration Session Number field, a Message Type field, a Reserved field and a Registration Session Start Flags field. The Start message may be referred to as a Registration Start message.

A UAS client shown in FIG. 16 corresponds to a UA client.

The Message type is set as Registration Session Start.

The Reserved field is set to 0.

The Registration Session Number field is provided by a UA client in order to track a registration sequence and to correlate a registration session message. When a registration sequence is initiated by a Registration Session Start message, a subsequent registration session message for a session sequence may include a Registration Session Number. The Registration Session Number field may be provided by a UA client in order to correlate a message with a registration sequence, and may be included in cryptographic calculations in order to prevent a relay attack.

While a registration session is performed, all messages may use a Session Number. Furthermore, a CMAC key may be used.

Register with SAS confirmed LTK of the Registration Session Start Flags field is a Registration Type by which a UA server must prove an SAS letter using the display of the device through the confirmation of a user. Register without SAS confirmed does not require the confirmation of a user.

The name, size or format of each field may be changed.

FIG. 17 shows an example of the fields of a Server Hash Commit message and information of each field.

The Server Hash Commit message includes a Message Type field, a Temporary Registration ID field, a Registration Session Number field, an H(KS_PUB) field, a User Interaction Type field and a User Interaction Data field.

The Message Type field is set as Registration Session Server Hash Commit. Contents regarding the Registration Session Number field are the same as that described above.

A UAS server shown in FIG. 17 corresponds to a UA server.

If a user is not a user registered with a device, a server may provide a client with a Temporary Registration ID. After a registration session procedure is completed, the Temporary Registration ID is changed into a user ID.

The H(KS_PUB) field is a hash generated based on the public key of a server. The H(KS_PUB) field may be 128 bits. For example, the H(KS_PUB) field may be generated using the following equation.

$$H(KS_{PUB})=\text{AES-CMAC(Registration Session Number}, KS_{PUB}\|KSY_{PUB}) \quad \text{[Equation 1]}$$

A User Interaction Type and User Interaction Data are described later.

The name, size or format of each field may be changed.

FIG. 18 shows an example of the fields of a client public key message and information of each field.

The Client Public Key message includes a Message Type field, a Registration ID field, a Registration Session Number field, a KCX_PUB field, a KCY_PUB field, an N_c field and a User Feedback Data field.

The Message Type field is set as a Registration Session Client Public Key. Contents regarding the Registration Session Number field are the same as that described above. The registration ID field corresponds to the above-described Temporary Registration ID field.

A UAS client shown in FIG. 18 corresponding to a UA client, and a UAS server corresponds to a UA server.

The KCX_PUB field corresponds to the X coordinates of a UA client public key. The KCY_PUB field corresponds to the Y coordinates of the UA client public key. The KCX_PUB field and the KCY_PUB field corresponding to the size of 32 octets, and may be based on ECDH P-256. KCX_PUB and KCY_PUB include KC_PUB.

The N_c field is the nonce of 16 bytes generated by a UA client.

The User Feedback Data field is the input data of a user collected by a UA client with respect to a User Interaction Type requested by a UA server.

The name, size or format of each field may be changed.

FIG. 19 shows an example of the fields of a server public key message and information of each field.

The Server Public Key message includes a Message Type field, a Registration ID field, a Registration Session Number field, a KCX_PUB field, a KCY_PUB field, an N_s field and a MAC_s field.

The Message Type field is set as a Registration Session Server Public Key.

Content regarding the Registration ID field and the Registration Session Number field are the same as those described above.

The KSX_PUB field corresponds to the X coordinates of a UA server public key. The KSY_PUB field corresponds to the Y coordinates of the UA server public key. The KSX_PUB field and the KSY_PUB field correspond to a 32 octet size, and may be based on ECDH P-256. KSX_PUB and KSY_PUB are included in KS_PUB.

A UAS server shown in FIG. 19 corresponds to a UA server.

The N_s field is the nonce of 16 bytes generated by a UA server.

The MAC_s field is a server public key hash. The MAC_s field is used by a UA client that authenticates that a key exchange occurs in an intended UA server. That is, the MAC_s field confirms that a message is transmitted to another device in order to confirm whether a message has been changed while the message is transmitted. The hash includes registration ID information.

The name, size or format of each field may be changed.

FIG. 20 shows an example of the fields of a Client Confirmation message and Abort message and information of each field.

(a) shows the fields of the Client Confirmation message and information of each field, and (b) shows the fields of the Abort message and information of each field.

A UAS client shown in FIG. 20 corresponds to a UA client, and a UAS server corresponds to a UA server.

The Client Confirmation message includes a Message Type field, a Registration ID field, a Registration Session Number field and a MAC_c field.

The Message Type field is set as Registration Session Client Confirmation. Contents regarding the Registration ID field and the Registration Session Number field are the same as those described above.

MAC_c information is client public key hash used by a UA server in order to authenticate that a key exchange occurs in an intended UA client. The MAC_c field confirms that a message is transmitted to another device in order to confirm whether a message has been changed while the message is transmitted. The hash includes registration ID information. The registration ID information is stored in the database of each device.

The Abort message includes a Message Type field and a Registration ID field. Contents regarding the Message Type field are the same as that described above. The Registration ID field includes registration ID information related to an aborted registration session.

The name, size or format of each field may be changed.

Figure 21:
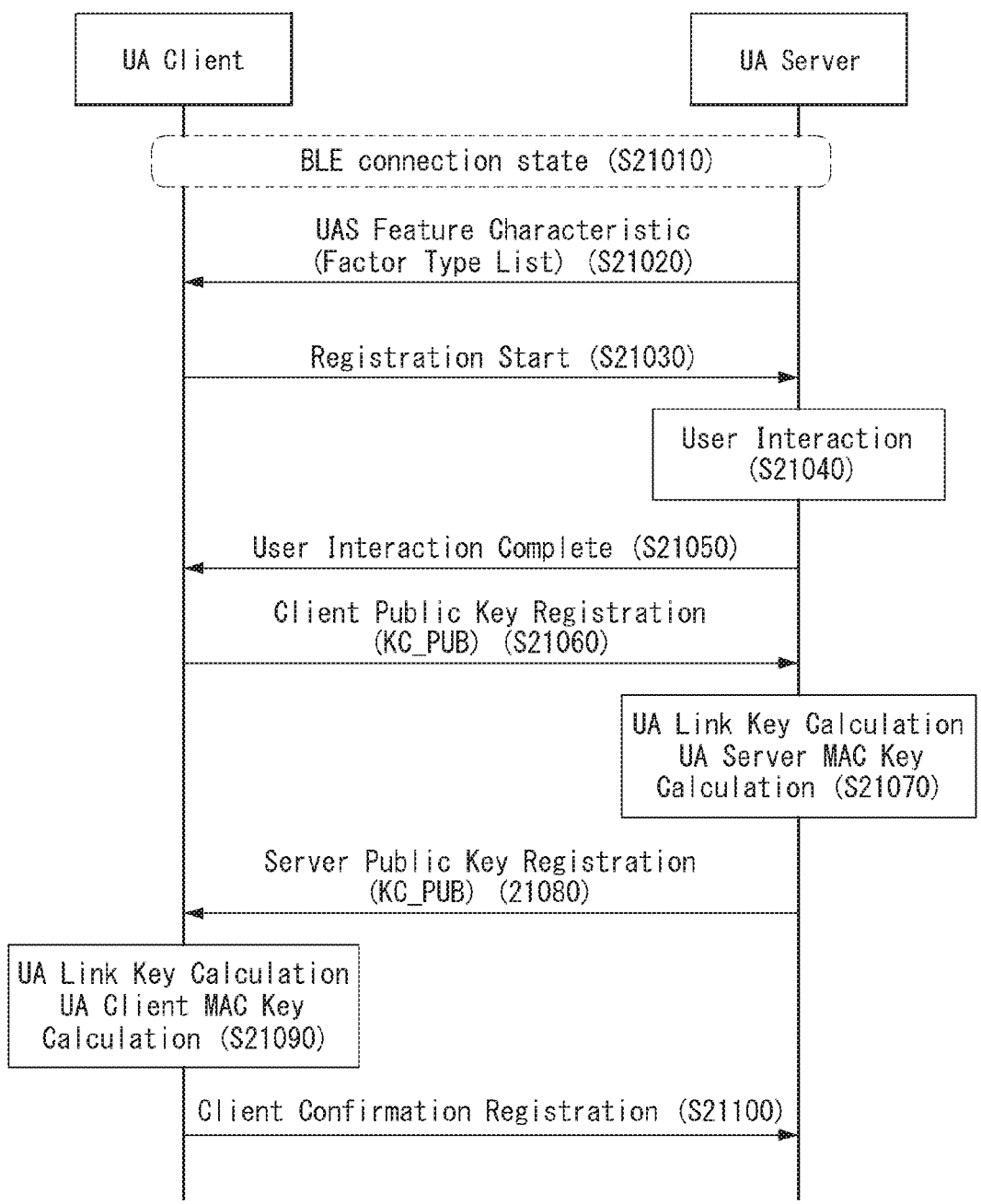
FIG. 21 shows an example of a flowchart of a registration session procedure including a user interaction procedure of authenticating a user.

FIG. 21 shows an example of a flowchart of a registration session procedure including a user interaction procedure of authenticating a user.

Differences with the procedures disclosed in FIGS. 10, 12, 13 and are chiefly described below.

A server receives a Registration Start message (S21030) (refer to step S14010 of FIG. 14), obtains information to identify a user, and performs a User Interaction procedure, that is, a procedure of authenticating a user, using the obtained ID information (S21040). The user interaction procedure may also be referred to as a user authentication procedure.

A User Interaction is a procedure of authenticating a user who uses a device. A UAS may use a User Interaction Type supported by a UAS device.

The User Interaction Type is determined based on a method of performing a User Interaction or a function supported by a device as the type of ID information. The User Interaction Type is related to the type of information that is requested by a UA server and received from a user.

The server may directly receive user information from a user based on the I/O capability of the server device. For example, if the server device is equipped with a fingerprint recognition system, it may receive fingerprint information of a user.

Table 4 shows an example of User Interaction Types and user input information input to a UA server according to each type.

TABLE 4

| Interaction Type | User Input on UA Server |
| --- | --- |
| PIN | Verify 6 digit number (ex. 2384) |
| Password | Verify any password (Mixed 10 alpha numeric characters) (ex. m5dhehg863) |
| Fingerprint | Verify a user's fingerprint on device (ex. Thumb, Index Finger, Middle Finger, etc) |
| Face | Verify a user's face on device |
| Voice | Verify a user's voice on device |
| Iris | Verify user's eyes on device |

TABLE 4-continued

| Interaction Type | User Input on UA Server |
| --- | --- |
| ECG | Verify user's ECG record on device |
| Pattern | Verify any pattern on device |
| Gesture | Verify any gesture on device (ex. Unfold palm, Wink, etc) |
| Finger Vein | Verify user's finger vein on device |
| Palm Vein | Verify user's palm vein on device |
| Bio-impedance | Verify user's bio-impedance on device |
| Knock-On | Verify user's knock-on pattern on device |
| RFU | N/A |

User Interaction Data is data received from a user based on a User Interaction Type requested by a UA server. For example, if a User Interaction Type is a fingerprint, User Interaction Data includes fingerprint information. A UAS can further enhance security by performing user authentication using a user's bio information (e.g., a fingerprint or an iris).

Table 5 shows an example of user interaction methods, that is, methods of authenticating a user using a User Interaction Type.

TABLE 5

| User Interaction | UA Client | UA Server |
| --- | --- | --- |
| Method #1 | Password input Device A or Device B | |
| Method #2 | Iris input Device A or Device B | |
| Method #3 | Pattern Input Device A or Device B | |

A password may be input to a client device Device A or a server device Device B (Method #1). Iris information may be input to the client device or the server device (Method #2). Pattern information may be input to the client device or the server device (Method #3). In addition, there may be a method using another User Interaction Type shown in Table 4.

After the User Interaction is performed, if a user is a new user not registered with the server, the server assigns a Temp User ID based on received user information. The server assigns a new server public key to the Temp User ID. Thereafter, the server transmits a Temp User ID to the client using a User Interaction Complete message. If a user is a user registered with the server, the server transmits a previously assigned user ID to the client.

The client receives the newly generated user ID, and a client public key to which a user has not been assigned is assigned to the client. Thereafter, the client transmits a message, including the client public key, to the server (S21060). If the received user ID has been previously assigned to the client, a new client public key is not assigned, and a public key corresponding to the stored user ID is transmitted to the server.

The server generates a link key and a MAC value using the received client public key (S21070). The MAC value may be referred to as a MAC key. The MAC value is obtained using the link key.

The server may generate the link key using an advanced encryption standard (AES)-cipher-based message authentication code (CMAC) algorithm as in Equation 2.

UA Link key=AES–CMAC(Registration Session
 Number, ECDH P-256(UA Server Private Key,
 UA Client Public Key)) [Equation 2]

The server may generate an encryption key using the AES-CMAC algorithm as in Equation 3 based on the obtained link key.

$$\text{Encryption Key} = \text{AES-CMAC}(\text{UA Link Key}, \text{User ID} \| N_s \| N_c) \quad \text{[Equation 3]}$$

The server may generate Encrypted Data and a MAC value using Equation 4 having the obtained encryption key as input. The MAC value of the server corresponds to MAC_s.

$$\text{Encryted Data}, \text{MAC}_s = \text{AES-CCM}(\text{Encryption Key}, \text{Nonce}, \text{Parameter}) \quad \text{[Equation 4]}$$

After generating the link key and the MAC value, the server transmits a message, including a server public key, to the client.

The client generates a link key and a MAC value using the received server public key (S21090).

The client may generate the link key using the AES-CMAC algorithm as in Equation 5.

$$\text{UA Link key} = \text{AES-CMAC}(\text{Registration Session Number}, \text{ECDH P-256}(\text{UA Client Private Key}, \text{UA Server Public Key})) \quad \text{[Equation 5]}$$

The client may generate an encryption key according to Equation 4 using the obtained link key.

The client may generate Encrypted Data and a MAC value as in Equation 6 using the obtained encryption key. The MAC value of the client corresponds to MAC_c.

$$\text{Encryted Data}, \text{MAC}_c = \text{AES-CCM}(\text{Encryption Key}, \text{Nonce}, \text{Parameter}) \quad \text{[Equation 6]}$$

As described above, the client and the server obtain the respective MAC values.

Thereafter, the client transmits a Confirmation message, indicating the completion of device registration, to the server. After the device registration is completed, the Temp ID of the user is stored as a user ID.

Figure 22:
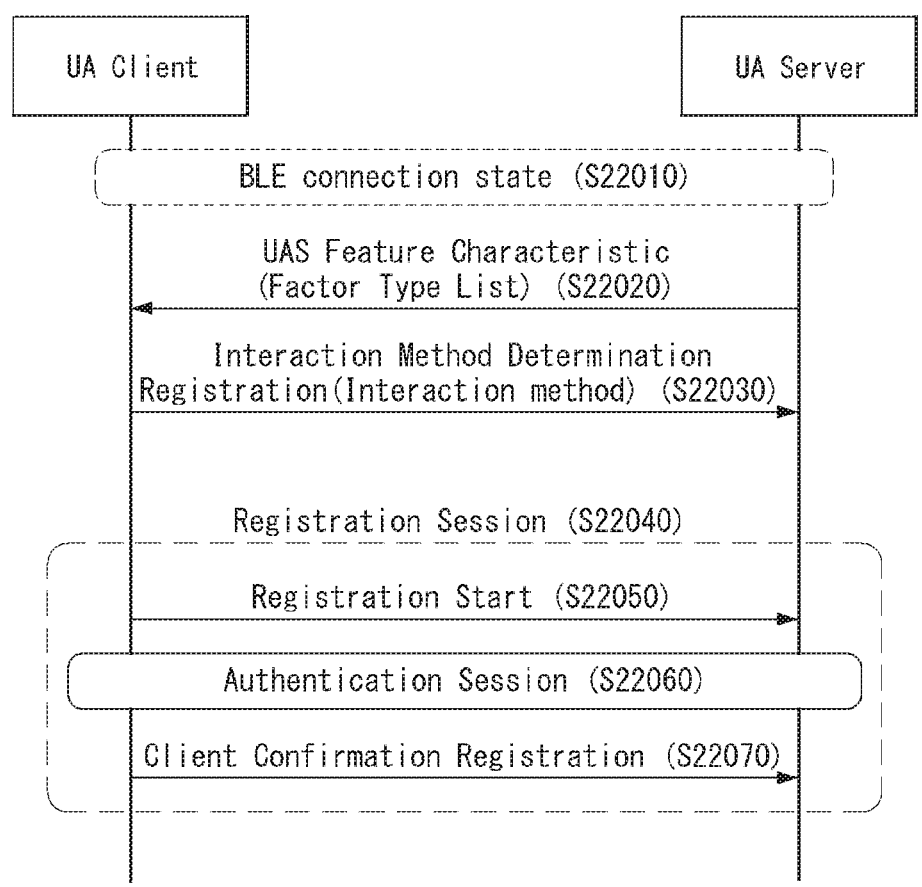
FIG. 22 is an example of a UAS procedure proposed in this specification and shows an example of a flowchart including a procedure of transmitting a message indicating an interaction method prior to a registration session procedure.

FIG. 22 is an example of a UAS procedure proposed in this specification and shows an example of a flowchart including a procedure of transmitting a message indicating an interaction method prior to a registration session procedure.

Hereinafter, differences with the flowcharts shown in FIGS. 10 and 15 are chiefly described. The same procedure refers to the description of the above-described drawings with reference to a reference numeral.

A client (UA Client) and a server (UA Server) form a BLE Connection State (S22010).

The client receives a UAS feature characteristic message from the server (S22020), and may transmit a message, including an authentication method to be used in a UAS procedure, to the server (S22030). The message may be referred to as an interaction method message. Thereafter, the client and the server perform a registration session procedure (S22040).

The client may determine that it will perform authentication using which method based on the received UAS Feature Characteristic information of the server. Thereafter, the client may transmit an interaction method message, including a user authentication method and/or a device interaction method, to the server (S22030). That is, the client may determine an authentication method based on the UAS feature characteristic. A user authentication procedure is a user interaction procedure. For the user authentication procedure, reference is made to the description related to FIG. 21. Contents regarding the device authentication procedure are described later.

The server performs an authentication session procedure with the client based on the authentication method included in the received interaction method message (S22060).

Figure 23:
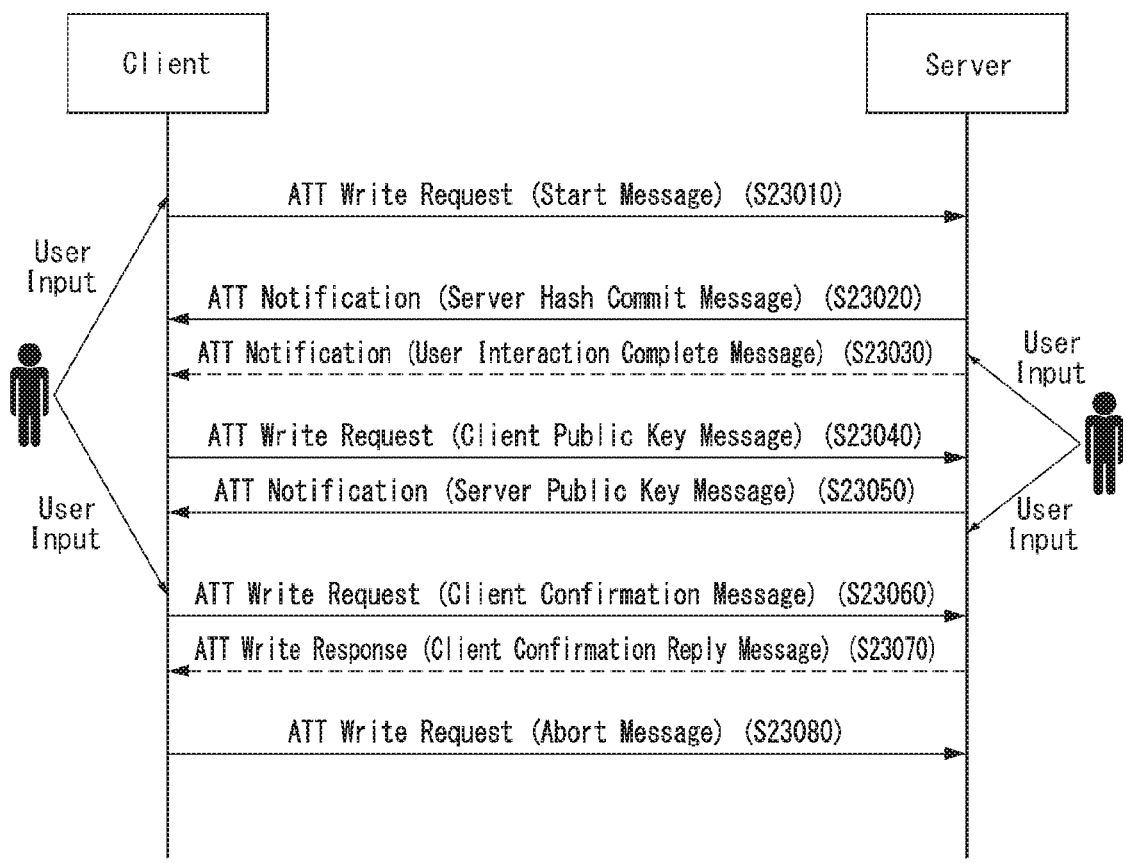
FIG. 23 shows an example of a flowchart showing a point at which a client and a server may obtain a user's input in a UAS procedure proposed in this specification.

FIG. 23 shows an example of a flowchart showing a point at which a client and a server may obtain a user's input in a UAS procedure proposed in this specification.

In the flowchart of FIG. 23, each message of the flowchart shown in FIG. 13 has been shown using an ATT protocol.

A user may perform a user input to a server device or a client device in a UAS procedure. The user input corresponds to that on which a user performs a specific operation, such a password input, a Confirm button click or a pattern input, with respect to a device or information obtained therefrom. The type of user input may be determined based on the I/O capability of the device. The user may perform a user input on one or more of a server device or a client device.

The client obtains a user input for starting a registration session from the user, and may the start a registration session procedure by transmitting a Write Request message to request the start of a registration session procedure (S23010). This procedure may be performed identically with step S14010 of FIG. 14.

The server may obtain a user input from the user and perform user authentication. In this case, the user input may correspond to user ID information. The server may obtain the user ID information and generate data to be used for user authentication. The type of user ID information may be determined based on the I/O capability of a device. For contents regarding the user authentication and the user ID information, reference is made to the description related to FIG. 21.

The client receives a notification message including a server public key (S23050). This procedure may be performed identically with step S140110 of FIG. 14. Thereafter, the client may obtain a user input to confirm device authentication from the user. After transmitting a server public key message to the client (S23050), the server may obtain a user input to confirm device authentication from the user. The confirmation of device authentication may be performed based on results generated when the user exchanges public keys between devices and a user input.

The device authentication procedure is described later.

Figure 24:
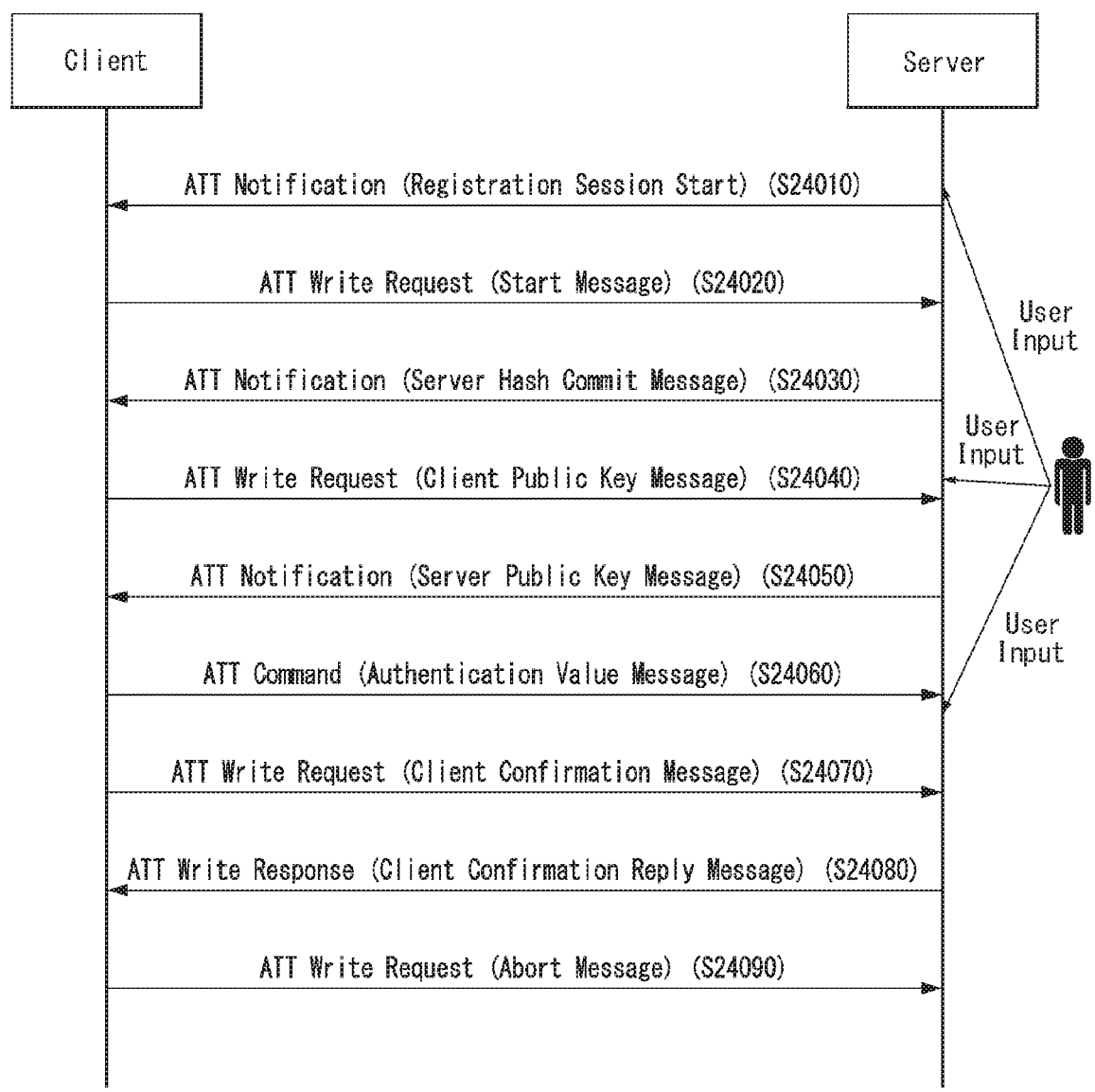
FIG. 24 shows an example of a flowchart showing a point at which a server may obtain a user's input in a UAS procedure proposed in this specification.

FIG. 24 shows an example of a flowchart showing a point at which a server may obtain a user's input in a UAS procedure proposed in this specification.

FIG. 24 shows a case where a user performs a user input only on the server device side. In this case, the user does not control a client device.

A server may obtain a user input to request the start of a registration session from a user. Thereafter, the server transmits a notification message to request the start of the registration session to a client (S24010). The notification message may be referred to as a Start Registration Session message. After receiving the Start Registration Session message, the client may transmit a Start message to the server (S24020). This procedure may be performed identically with step S14010 of FIG. 14.

The server transmits a Server Hash Commit message to the client (S24030). This procedure may be performed identically with step S14030 of FIG. 14. Thereafter, the server may obtain a user input to perform user authentication.

After transmitting a server public key message to the client (S24050), the server may receive a command message, including data obtained by the client, using an exchanged public key (S24060). The message may be referred to as an authentication value message. For example, the authentication value message may include MAC_c generated in the client. Thereafter, the server may obtain a user input to confirm device authentication from the user.

Figure 25:
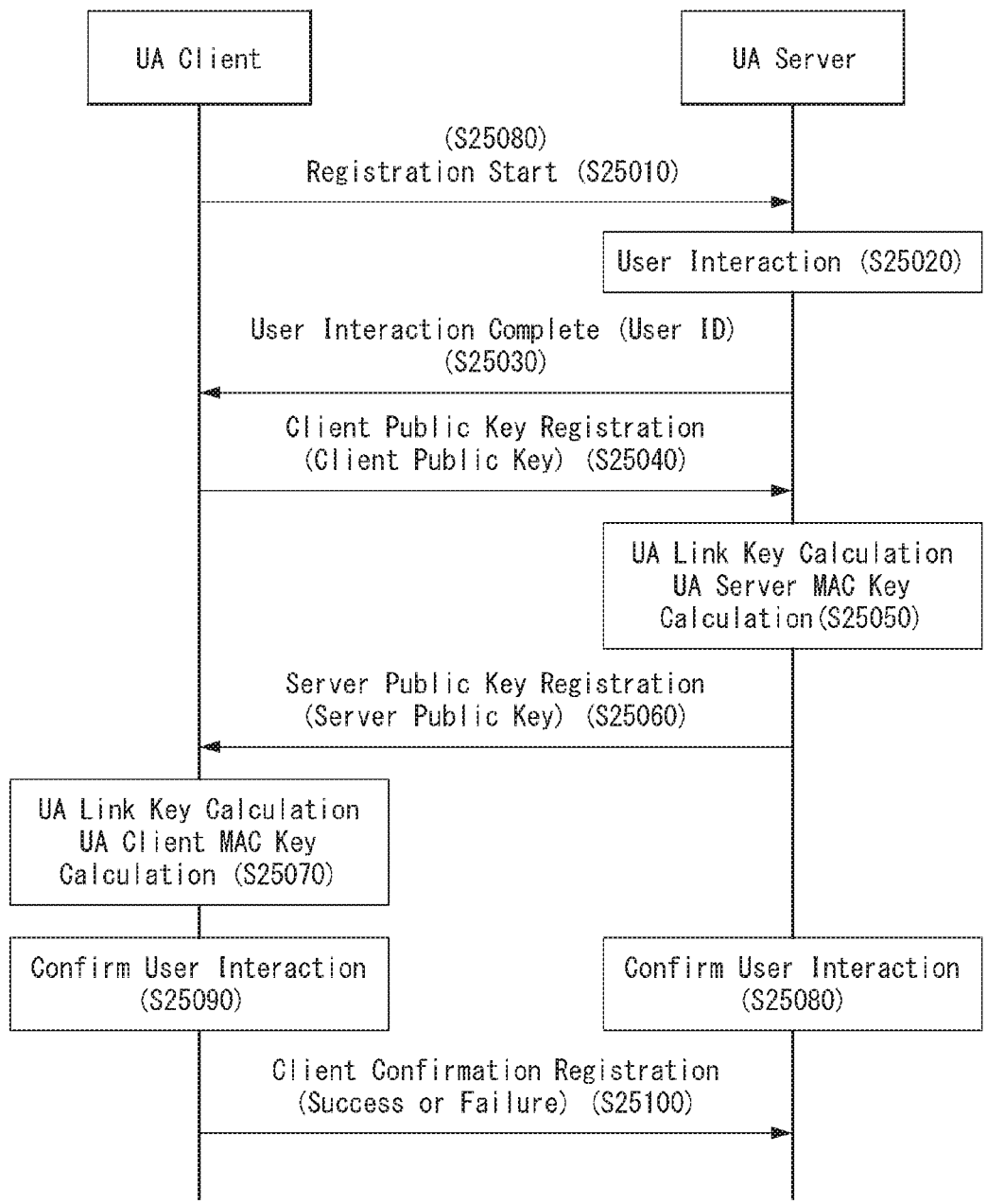
FIG. 25 shows an example of a flowchart of a registration session procedure including a device authentication procedure proposed in this specification.

FIG. 25 shows an example of a flowchart of a registration session procedure including a device authentication procedure proposed in this specification.

Hereinafter, a device authentication procedure, that is, a difference with the flowchart disclosed in FIG. 21, is chiefly described.

The device authentication procedure may be referred to as a Confirm User Interaction, Device Authentication, a Device Interaction or a Device Authentication Interaction.

The device authentication procedure is performed in each of a server and a client.

The server transmits a server public key message to the client and then performs a Confirm User Interaction procedure (S25080). The client receives a server public key message, obtains a MAC value using the method described in the description of FIG. 21, and then performs a Confirm user interaction procedure (S25090).

For the details of the MAC value, reference is made to FIG. 21. The details of the device authentication procedure are described in description related to FIG. 26.

Figure 26:
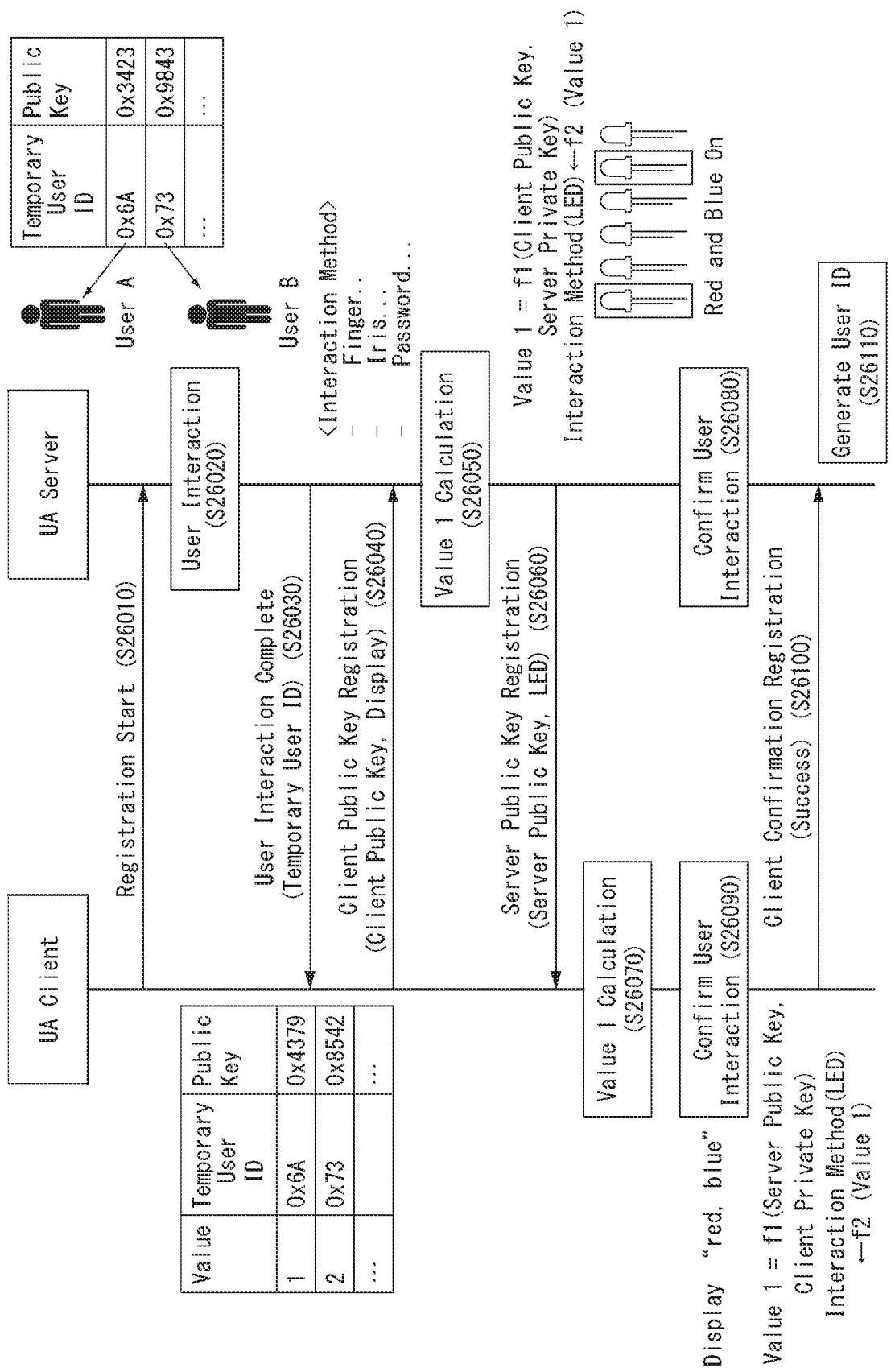
FIG. 26 shows another example of a flowchart of a registration session procedure including a device authentication procedure proposed in this specification.

FIG. 26 shows another example of a flowchart of a registration session procedure including a device authentication procedure proposed in this specification.

A server receives a registration start message (S26010), and performs a user interaction procedure (S26020). Thereafter, the server transmits a User Interaction Complete message, including a Temp User ID, to a client (S26030). The start message reception, user interaction procedure execution and user interaction Complete message transmission procedures may be performed identically with the S14010 procedure of FIG. 14, the S21040 procedure of FIG. 21 and the S14060 procedure of FIG. 14, respectively.

After transmitting the user interaction Complete message, the server receives a Write Request message, including a client public key, from the client (S26040). The Write Request message may be referred to as a client Registration Client Public Key message. In this case, the Write Request message includes I/O Capability information of the client. For example, if the client device includes a display, the Write Request message includes information indicating that the client has a display I/O capability.

Thereafter, the server obtains a first value (Value 1) through a first algorithm having the obtained public key of the client as an input value (S26050). For example, as shown in FIG. 26, if the first algorithm is represented as f1, a method for the server to obtain the first value may be represented as Value1=f1 (Client Public Key, Server Private Key).

After obtaining the first value, the server transmits a notification message, including a server public key, to the client (S26060). The notification message may be referred to as a Registration Server Public Key message. In this case, the notification message includes I/O capability information of the server. For example, if the server device includes an LED, the notification message includes information indicating that the server has an LED output capability.

The client obtains a first value (Value 1) through a specific algorithm having the obtained server public key as an input value (S26070). The specific algorithm corresponds to the same algorithm as the first algorithm used by the server. For example, a method for the client to obtain the first value may be represented (Value1=f1 (Server Public Key, Client Public Key)). The client obtains the same value as the value, obtained by the server, through the first algorithm (f1).

As described above, each device obtains I/O information of a counterpart device by exchanging I/O capability information with the counterpart device. Each device may perform a Confirm interaction procedure to be described later using the I/O information. Accordingly, each device may perform authentication by selecting a proper method based on the obtained I/O information.

Table 6 shows an example of device interaction types used in device authentication and a device action according to each type.

TABLE 6

| Device Interaction Type | Device Action for authentication |
| --- | --- |
| PIN | Show 6 digit number on device's display |
| Password | Show mixed 10 number & word |
| LED Blinking | Show as LED blinking (ex. Red, Green, etc) |
| Vibration | Vibrate a device |
| Pattern | Show any pattern on device's display |
| Sentence | Show any sentence on device's display |
| RFU | N/A |

A client and a server may present output, corresponding to the above first value, using a Device Interaction Type supported in each device.

The server may output information, corresponding to a first value (Value 1) obtained the public key of the client, through an output unit. A code corresponds to a MAC value. In this case, an output method may be determined based on at least one of the output capability of the server and a device interaction type supported in the server. For example, if the output unit of the server device is an LED and a device interaction type is LED Blinking of Table 6, the server may blink an LED of a color corresponding to a first value.

Likewise, the client may output information, corresponding to a first value obtained using the server public key, through an output unit. In this case, an output method may be determined based on the output capability of the client and/or a device interaction type supported in the client. For example, if the output unit of the client device is a display and a device interaction type is PIN of Table 6, the client may display "123456", corresponding to a first value, on the display.

After transmitting the server public key message to the client, the server performs a Confirm user interaction procedure of authenticating the device (S26080). The Confirm user interaction procedure corresponds to a device authentication procedure. The device authentication procedure is a procedure of authenticating a device after user authentication for device registration in a registration session procedure.

In the Confirm user interaction procedure, the server obtains input information related to device authentication from a user. The input information is information on a specific input performed by the user in the server device. For example, the server may obtain a specific pattern, input by the user in the display of the server device, as the input information.

The input information obtained by the server may correspond to information on input, performed by the user in the server device based on output corresponding to the first value output by the client device. For example, if the server has a pattern input capability, the user may confirm a pattern displayed on the display of the client device, and may input the same pattern as the pattern to the server device. In this case, the server obtains the pattern information as input information.

The server obtains a second value using a second algorithm based on the obtained input information. The second algorithm corresponds to an algorithm different from the above-described first algorithm. For example, as disclosed in FIG. 26, a method of applying the second algorithm may be represented as (Interaction Method (LED)←f2 (Value 1)).

The server may determine whether device authentication is successful by comparing the first value, obtained using the first algorithm, with the second value obtained using the second algorithm. If the first value and the second value are identical, the server may determine that authentication is successful. If the first value and the second value are not identical, the server may determine that authentication is an authentication failure.

Likewise, the client may perform device authentication through a comparison between the obtained first value and the obtained second value using the same method as that performed in the server.

As described above, each of the client and the server may authenticate a device using a Confirm User Interaction.

The server or the client may separately represent whether authentication is successful, if necessary. In this case, a representation method may be determined based on the output capability of a device.

Device authentication confirmation is a procedure of confirming that device authentication is successful, and may be performed by a user in a server or client based on the type of device or an I/O capability. The device authentication confirmation procedure is included in a device authentication procedure. Each device may obtain confirmation information to confirm the device authentication.

A server performs the output of information corresponding to a first value, and then may obtain a user input by which a user confirms device authentication. For example, the user may confirm that authentication is successful based on output results displayed in each device of the server and the client, and may complete device authentication by clicking on a Confirm button in the input unit of the server device. In this case, the server obtains device authentication confirmation information occurring when the user clicks on the Confirm button. A method of obtaining information related to device authentication confirmation may be determined based on the input capability of the server.

After performing the Confirm user interaction procedure, the client transmits a Client Confirmation message, that is, a Write Request message including information indicating device authentication results, to the server (S26100). This procedure may be performed using the same method as step 140130 of FIG. 14.

The server may complete a server authentication procedure based on the Write Request message, indicating whether the authentication of the client device is successful and received from the client.

Table 7 shows an example of methods of performing device interaction.

TABLE 7

| Confirm User Interaction | UA Client | UA Server |
|---|---|---|
| Method #1 | Generate unique Pattern using DA_value and then display the Pattern | User has to input Same Pattern displayed Device A |
| Method #2 | Generate vibration using DA_value | Display Count of vibration |
| Method #3 | Generate LED blinking using DA_value | Display color of LED blinking |

Confirm User Interaction corresponds to a device interaction. DA_value indicates a value obtained by a client using a public key.

Method #1: a client generates a unique pattern using a DA_value and displays the generated pattern. A user inputs the same pattern as the pattern displayed on a client device Device A to a server device.

Method #2: a client generates vibration using a DA_value. A server device displays a vibration number.

Method #3: a client generates LED blinking using a DA_value. A server device displays the color of a blinking LED.

In addition to the above-described methods, a device interaction may be performed in various manners based on the feature of each device.

If a device authentication procedure is completed and a device has been registered, the server stores a Temp User ID as a user ID (S26110).

Figure 27:
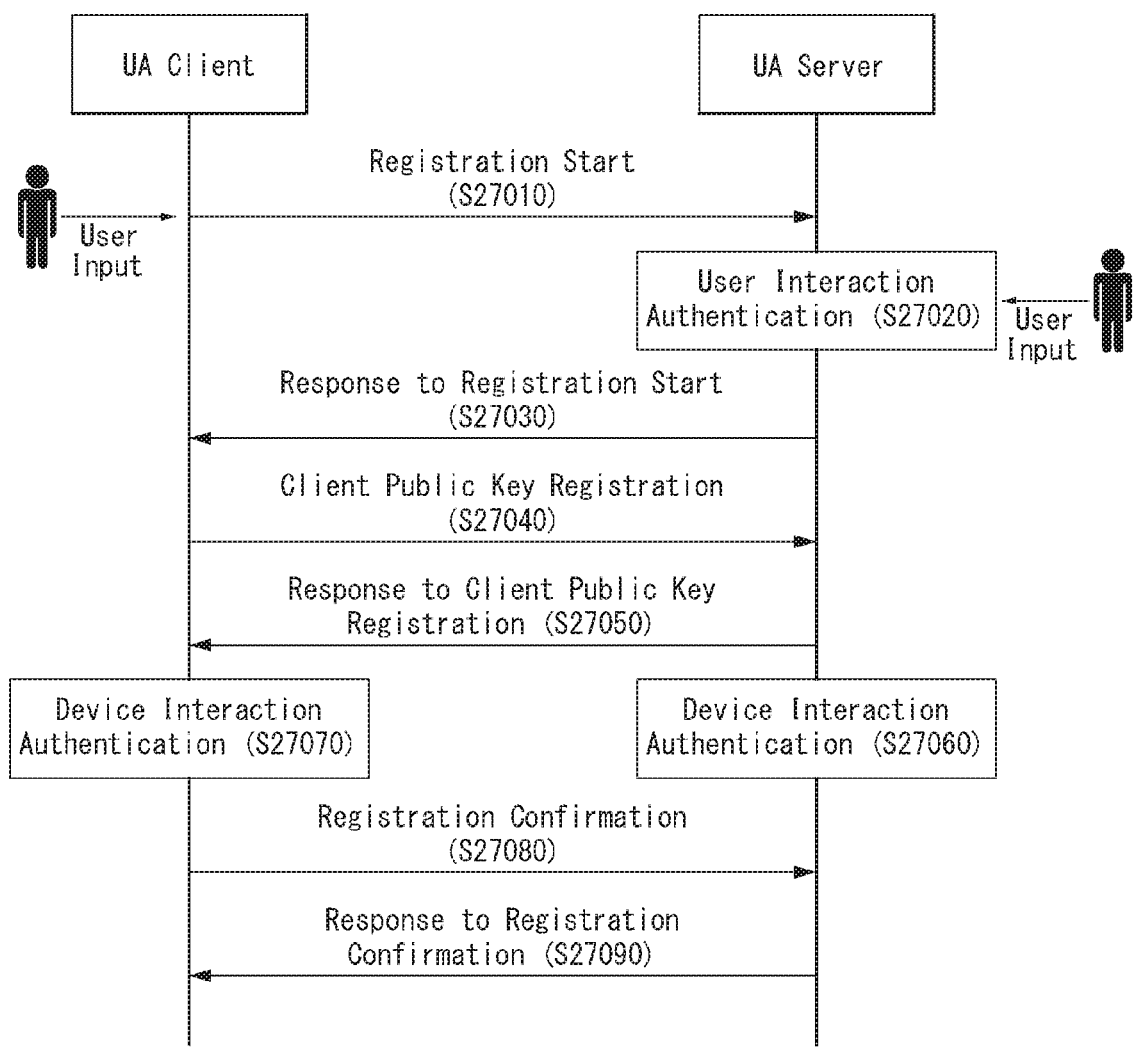
FIG. 27 is an example of the first authentication procedure between devices and shows a case where a server performs a user interaction authentication procedure and the server and a client obtain respective user inputs.

FIG. 27 is an example of the first authentication procedure between devices and shows a case where a server performs a user interaction authentication procedure and the server and a client obtain respective user inputs.

The server and the client may obtain respective user inputs. The user input indicates specific information obtained by a device from a user for user authentication or device authentication. The user input is related to one of information to request an authentication start, user ID information and information related to device authentication.

The client obtains a user input to request the start of a user authentication procedure or a registration start. For example, when the user presses an authentication start button, the client device transmits a message to request the start of an authentication procedure (S27010). This procedure may be performed identically with step S14010 of FIG. 14.

The server obtains user ID information as a user input in a User Interaction authentication procedure (S27020).

The remaining procedures may be performed identically with the procedures disclosed in the description related to FIGS. 21 to 26.

Figure 28:
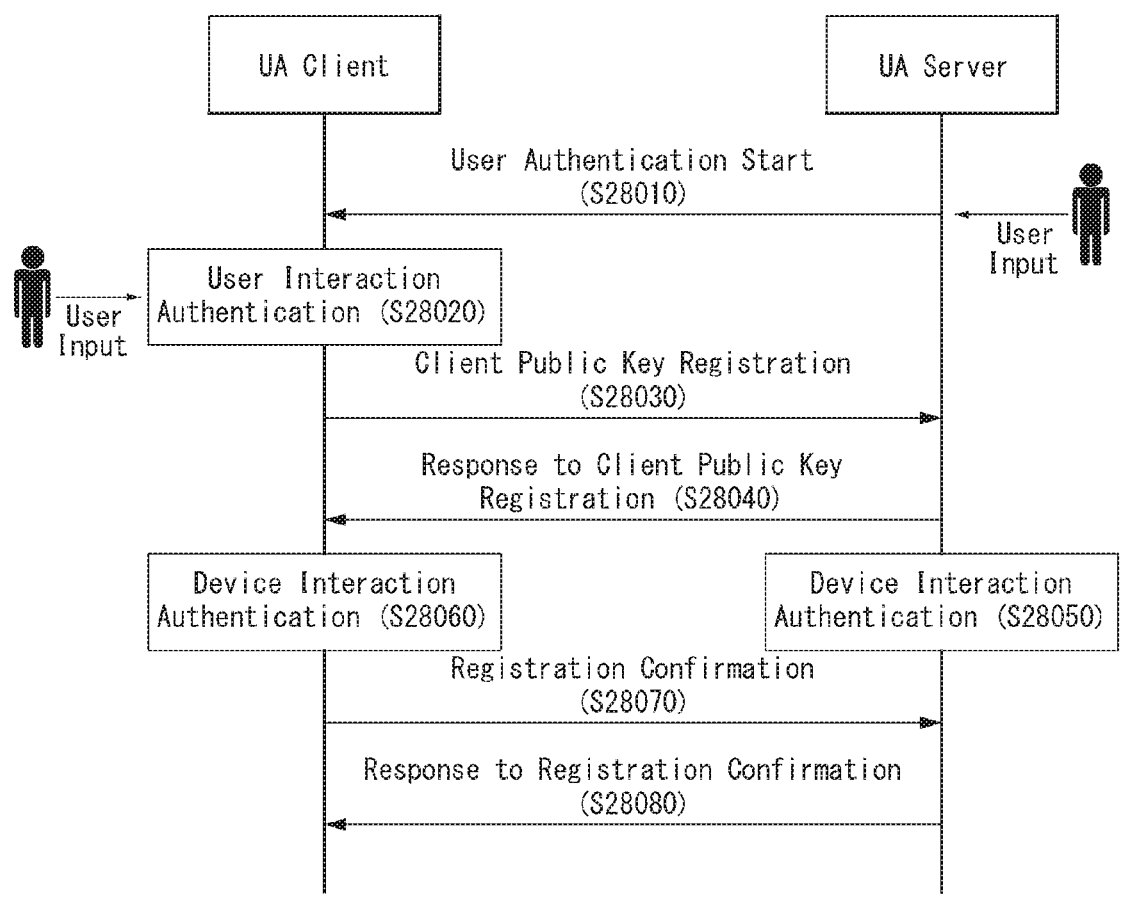
FIG. 28 is an example of the first authentication procedure between devices and shows a case where a client performs a user interaction authentication procedure and a server and the client obtain respective user inputs.

FIG. 28 is an example of the first authentication procedure between devices and shows a case where a client performs a user interaction authentication procedure and a server and the client obtain respective user inputs.

User authentication may be performed in a client not a server based on the I/O capability of each device.

The server obtains a user input to request a user authentication start, and transmits a message, indicating that the server has obtained a related user input and requesting a user authentication start, to the client (S28010). The message may be referred to as a User Authentication Start message. For example, the authentication start may be requested by pressing an authentication start button in the server device.

The client obtains user ID information as a user input and performs a user interaction authentication procedure (S28020). The user interaction authentication procedure performed in the client may be performed using the same method as the user interaction authentication procedure (S21040) performed in the server in the description related to FIG. 21.

The remaining procedures may be performed identically with the procedures disclosed in the description related to FIGS. 21 to 26.

Figure 29:
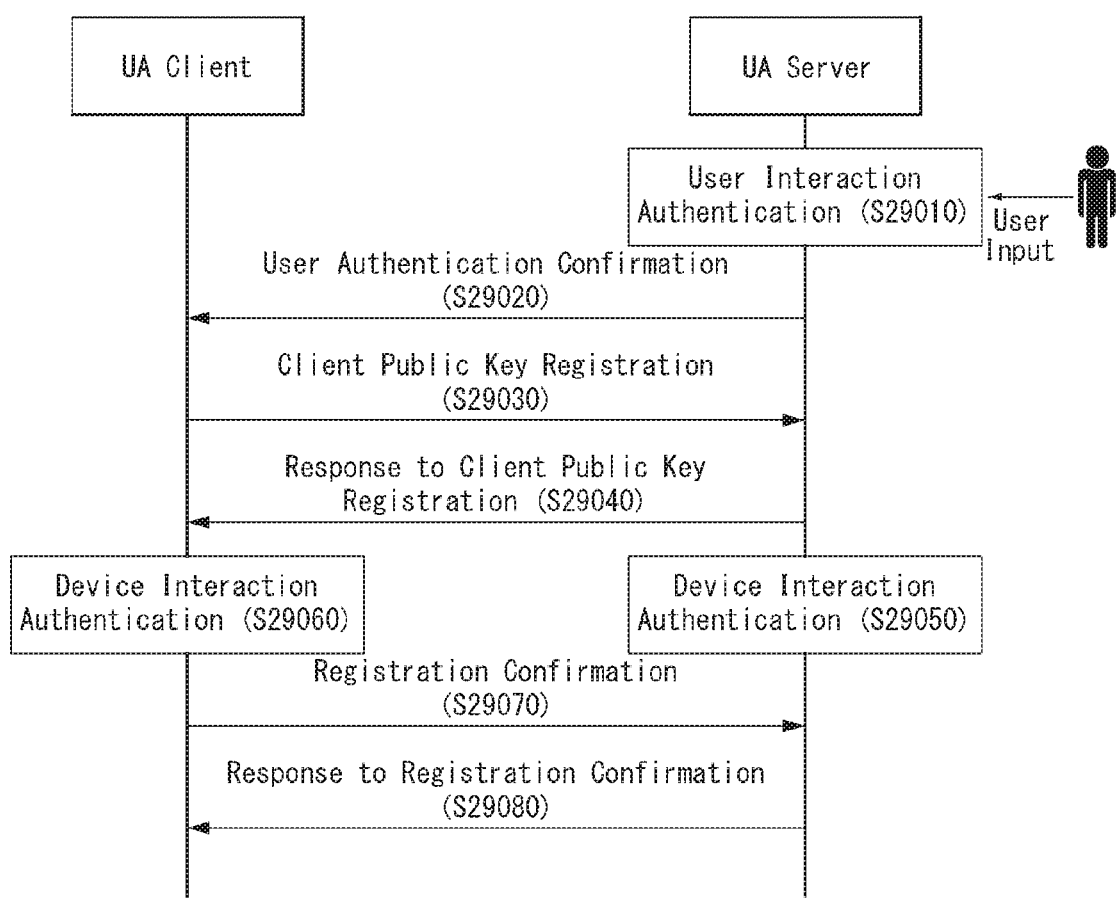
FIG. 29 is an example of the first authentication procedure between devices and shows a case where a server performs a user interaction authentication procedure and obtains a user's input.

FIG. 29 is an example of the first authentication procedure between devices and shows a case where a server performs a user interaction authentication procedure and obtains a user's input.

A registration session may be started without the transmission and reception of messages to request an authentication procedure start. Furthermore, a user may perform a user input only in a server.

The server first obtains user ID information as a user input and performs a user interaction authentication procedure (S29010). This procedure may be performed identically with the S21040 procedure of FIG. 21. Thereafter, the server transmits a User Authentication Confirmation message, indicating that user authentication has been performed in the server, to the client (S29020).

The remaining procedures may be performed identically with the procedures disclosed in the description related to FIGS. 21 to 26.

Figure 30:
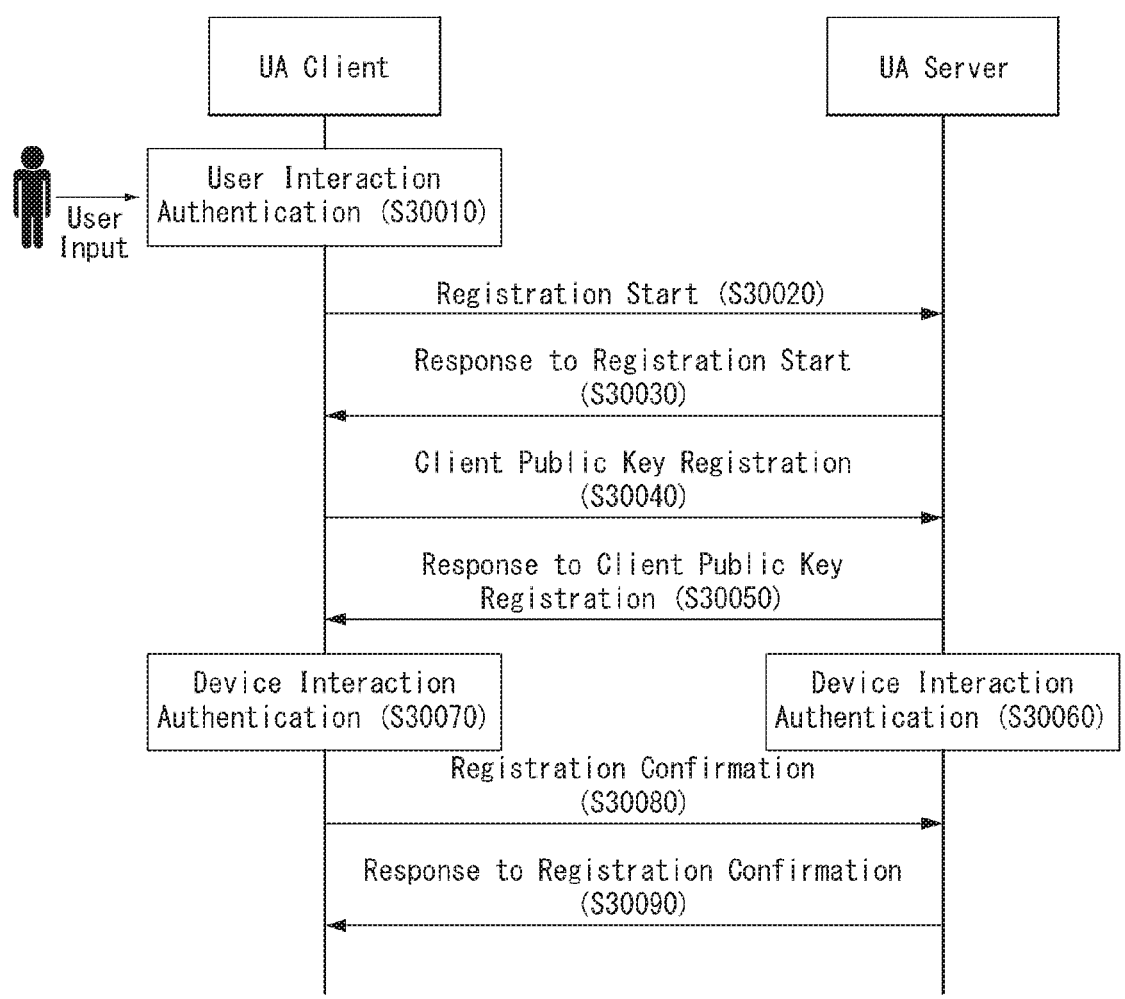
FIG. 30 is an example of the first authentication procedure between devices and shows a case where a client performs a user interaction authentication procedure and obtains a user's input.

FIG. 30 is an example of the first authentication procedure between devices and shows a case where a client performs a user interaction authentication procedure and obtains a user's input.

As described above, user authentication may be performed in a client not a server based on the I/O capability of each device.

The client obtains user ID information and performs user interaction authentication (S30010). After the user interaction authentication, the client transmits a message to request the start of an authentication procedure to the server (S30020). This procedure may be performed identically with step S14010 of FIG. 14.

The remaining procedures may be performed identically with the procedures disclosed in the description related to FIGS. 21 to 26.

Figure 31:
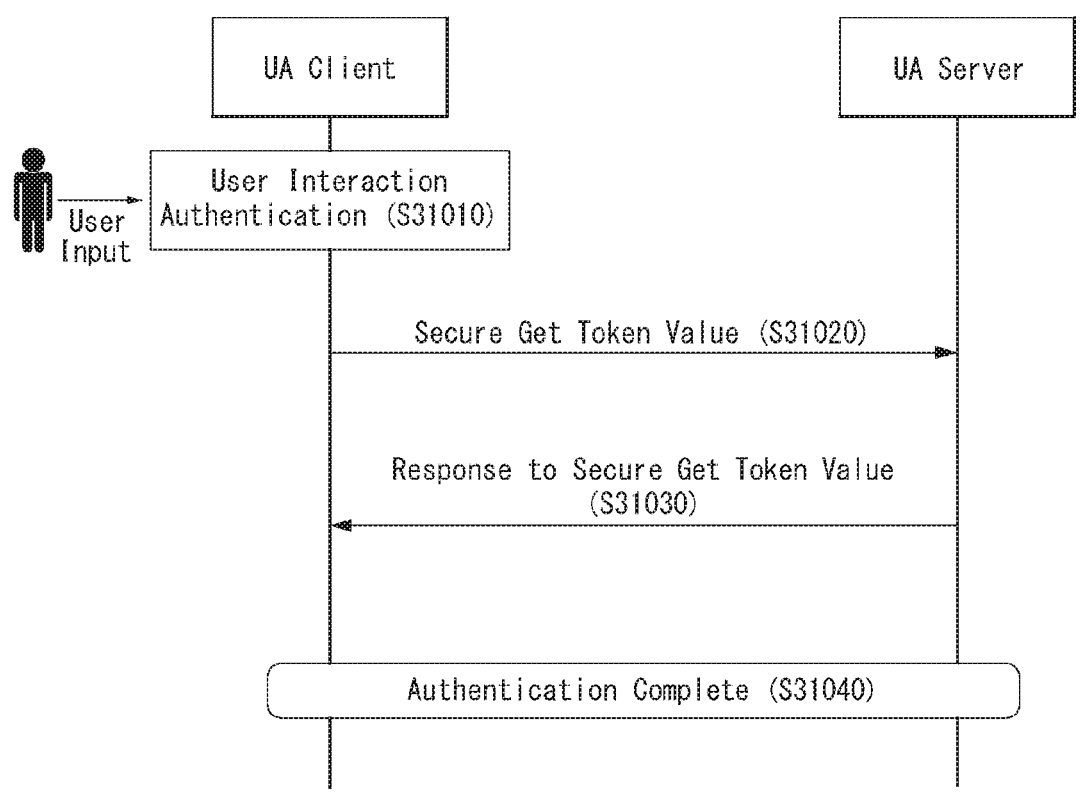
FIG. 31 shows an example in which authentication is performed after the first authentication procedure between devices.

FIG. 31 shows an example in which authentication is performed after the first authentication procedure between devices.

A client performs user interaction authentication using obtained user ID information (S31010), and transmits a message, requesting one token transmission for a secure session, to a server (S31020). The message may be referred to as a Secure Get Token Value message.

The server transmits a response message for a Secure Token Get message to the client (S31030). The message may be referred to as a Response to Secure Get Token Value message. Authentication between the client and the server is completed through the above-described procedure (S13040).

Figure 32:
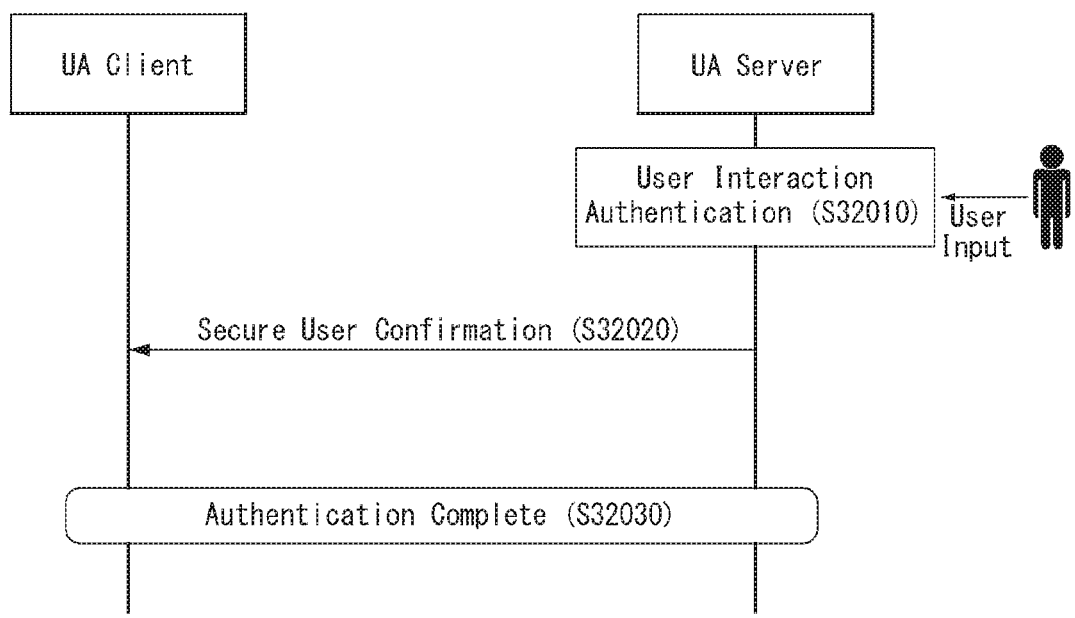
FIG. 32 shows another example in which authentication is performed after the first authentication procedure between devices.

FIG. 32 shows another example in which authentication is performed after the first authentication procedure between devices.

A server obtains user ID information as a user input and performs user interaction authentication (S32010). Thereafter, the server transmits a message, indicating that a user has performed authentication through the server after the first authentication, to the client (S32020). The message may be referred to as a Secure User Confirmation message. Authentication is completed through the above-described procedure (S32030).

Figure 33:
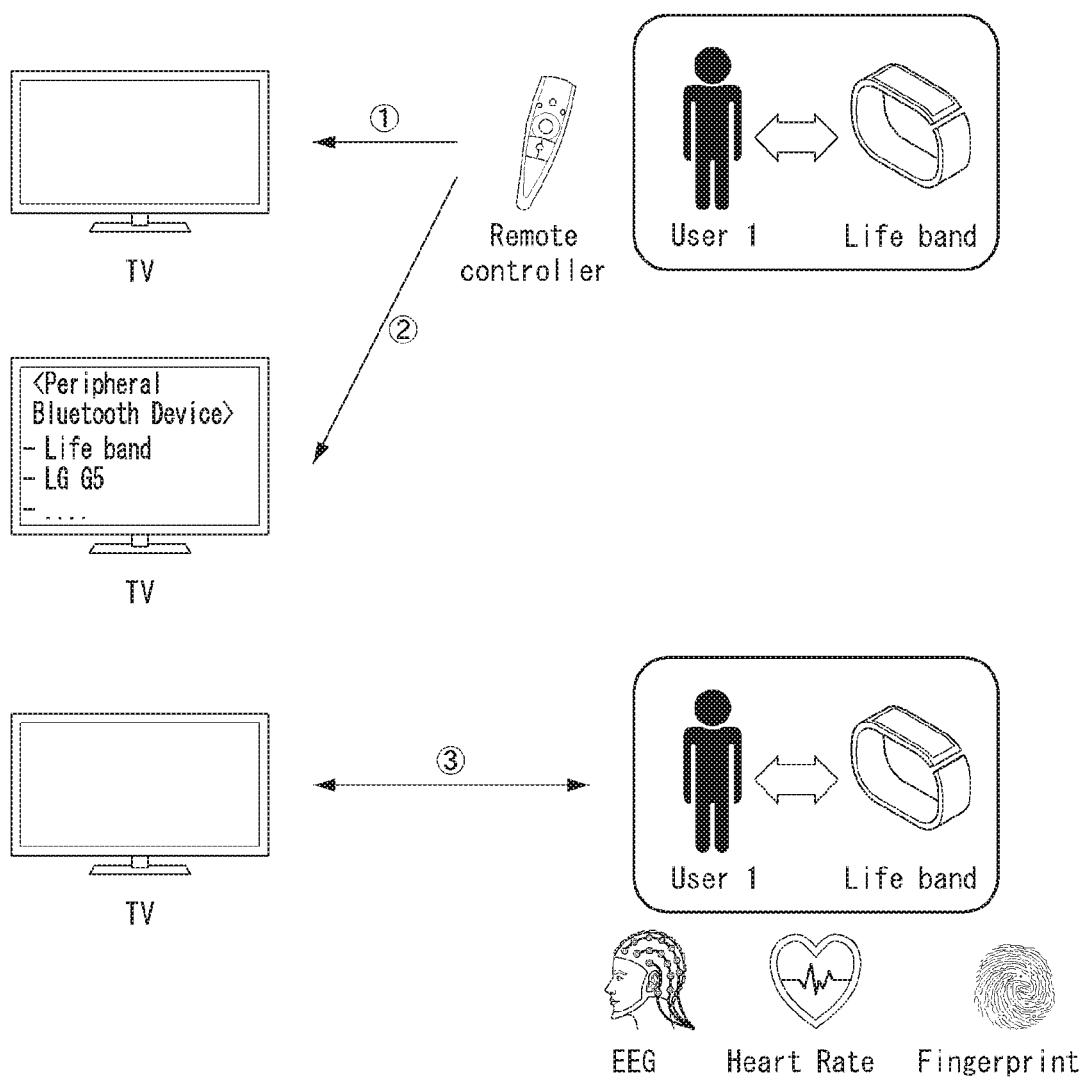
FIG. 33 shows an example in which authentication is performed using a device with which a Bluetooth connection is required and a user's bio information in a Bluetooth authentication process.

FIG. 33 shows an example in which authentication is performed using a device with which a Bluetooth connection is required and a user's bio information in a Bluetooth authentication process.

A user discovers a specific device with which a Bluetooth connection is required in the state in which the user has worn a wearable device capable of Bluetooth communication. As shown in FIG. 33, the wearable device may be a life band, and other devices may be TV, a smart device, etc.

The user first turns on a device with which a connection is required, and discovers the specific device using a separate controller if necessary. For example, the separate controller may be a remote controller. In this case, the user controls the controller in order to discover a device.

If a Bluetooth connection between the two devices is not the first connection, the two devices immediately form a Bluetooth connection. In this case, Bluetooth of each device must be an enabled state.

After the device discovery, the two devices exchange authentication information for authentication. The authentication information may be generated using user ID information to identify the user. The type of ID information may be determined based on the feature of a wearable device. The ID information may be a user's bio information. For example, a device may generate authentication information using information, such as the EEG, heart rate, fingerprint of a user, and may exchange the authentication information.

The two devices confirm whether the exchanged authentication information is the same. If the exchanged authentication information is the same, a Bluetooth connection is formed. In this case, the two devices may display indication for a connection success, and may transmit a message, indicating that authentication is successful, to a counterpart device.

A Bluetooth connection is not formed if the authentication information is not the same. In this case, the two devices may display indication for a connection failure or may transmit a message indicative of an authentication failure to a counterpart device.

Figure 34:
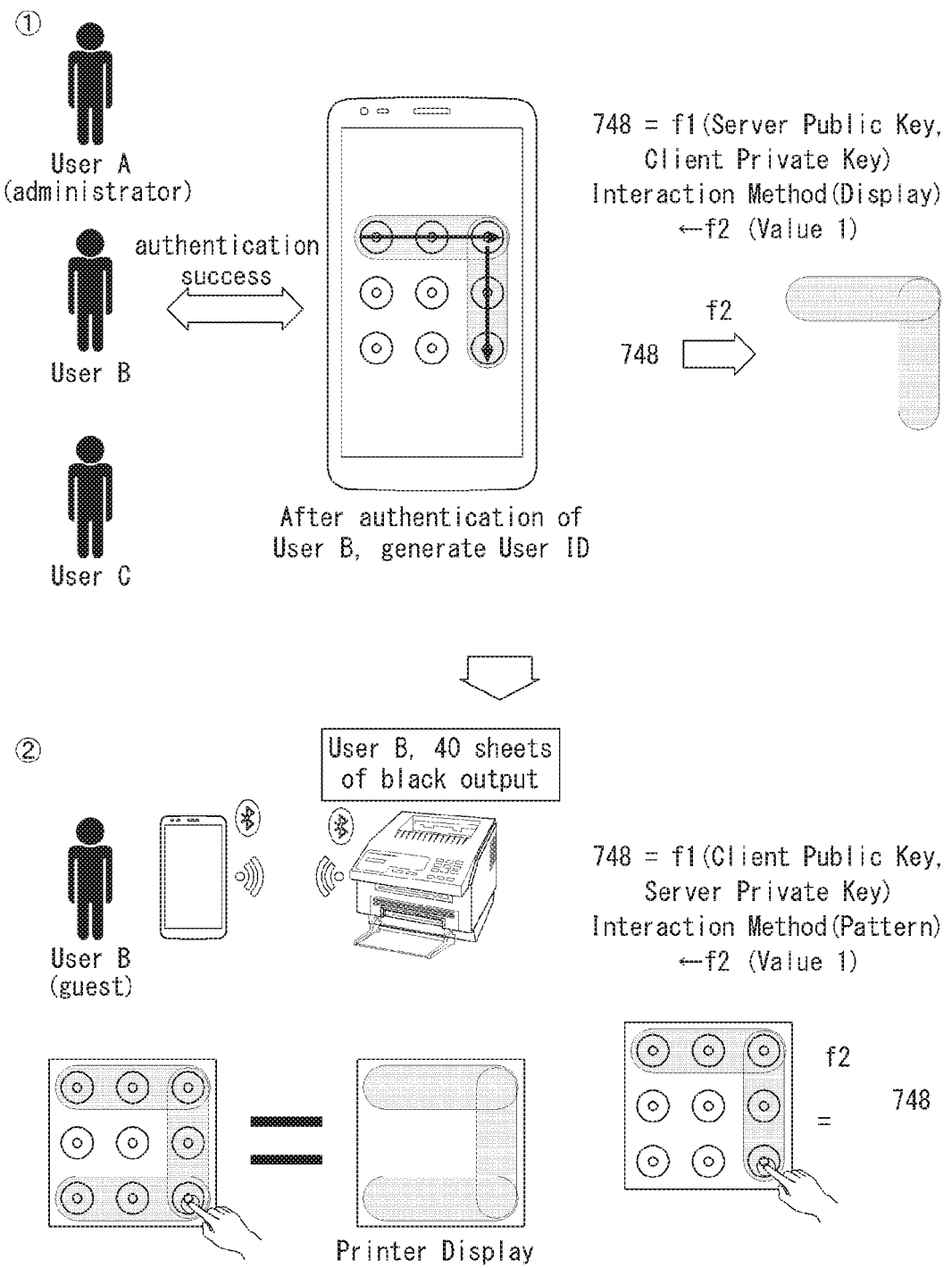
FIG. 34 shows an example of a method of performing an authentication procedure in two devices using a pattern input.

FIG. 34 shows an example of a method of performing an authentication procedure in two devices using a pattern input.

Users A, B and C are separate users. The user A is an administrator. The user B attempts to form a Bluetooth connection with a print device using a smart device. If a user is not an administrator, a device may be configured so that a user uses only a limited function after a Bluetooth connection. For example, a user not an administrator may have a limited device function so that only black output can be used.

The user B first performs user authentication using a pattern known to the user B only. A smart device generates the ID of the user B based on a pattern in order to perform authentication with a print device. In this case, if the user B is a user who first performs Bluetooth authentication not registered with the smart device, the smart device generates a new ID. If the user B is a registered user, the smart device uses a previously assigned ID.

Initial registration is performed in the smart device and the print device. The print device obtains a specific value through a specific algorithm (f1) using keys exchanged through the transmission and reception procedure of the above-described public keys. In the case of the example disclosed in FIG. 34, the print device obtains 748 as a specific value and outputs a pattern, corresponding to 748, through a display.

The user confirms the pattern displayed in the print device and inputs the same pattern to the smart device. The smart device obtains a corresponding value from the input pattern, and completes authentication when the value obtained from the pattern is identical with the value generated by the key exchange. After the authentication completion, the devices are connected.

Figure 35:
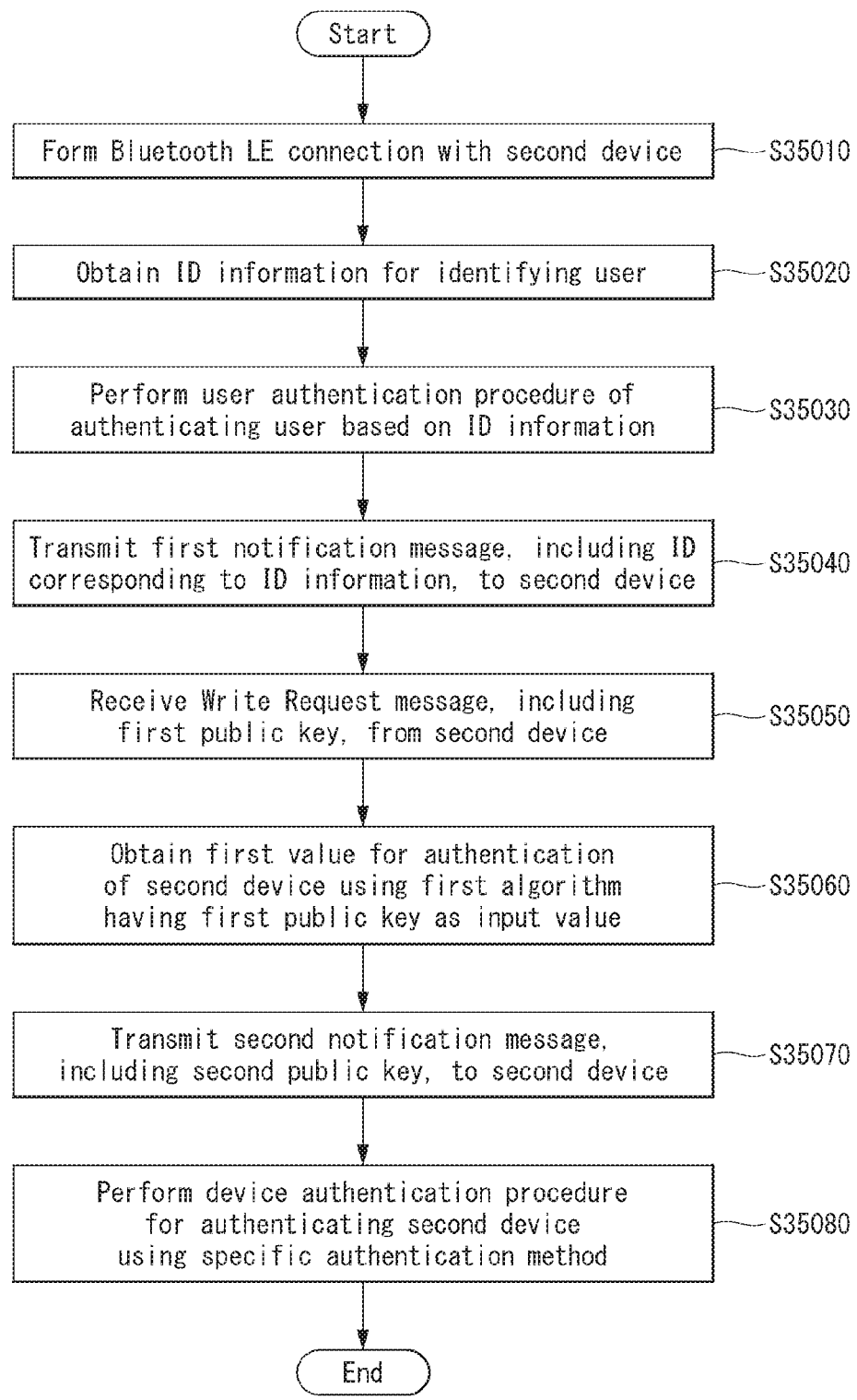
FIG. 35 shows an example of a flowchart in which a server performs authentication for device registration.

FIG. 35 shows an example of a flowchart in which a server performs authentication for device registration.

In the flowchart disclosed in FIG. 35, a first device corresponds to a server device, and a second device corresponds to a client device.

The server device forms a Bluetooth LE connection with the client (S35010). This step may be performed identically with step S13010 of FIG. 13.

The server device obtains ID information for identifying a user (S35020).

The server device performs user authentication procedure of authenticating a user based on the ID information (S35030). This procedure may be performed identically with step S21040 of FIG. 21.

The server device transmits a first notification message, including an ID corresponding to the ID information, to the client device (S35040). This procedure may be performed identically with step S14060 of FIG. 14.

The server device receives a Write Request message, including a first public key (the public key of the client), from the client device (S35050). The Write Request message includes I/O capability information of the client device. For details thereof, reference is made to the description related to FIG. 26.

The server device obtains a first value for the authentication of the client device using a first algorithm having the first public key as an input value (S35060). For details thereof, reference is made to the description related to FIG. 26.

The server device transmits a notification message, including a second public key (the public key of the server), to the client device (S35070). The notification message includes I/O capability information of the server device. For details thereof, reference is made to the description related to FIG. 26.

The server device performs a device authentication procedure for authenticating the client device using a specific authentication method (S35080). For details thereof, reference is made of the description related to FIG. 26.

For the details of each step, reference is made to the description regarding the above-described drawings.

Figure 36:
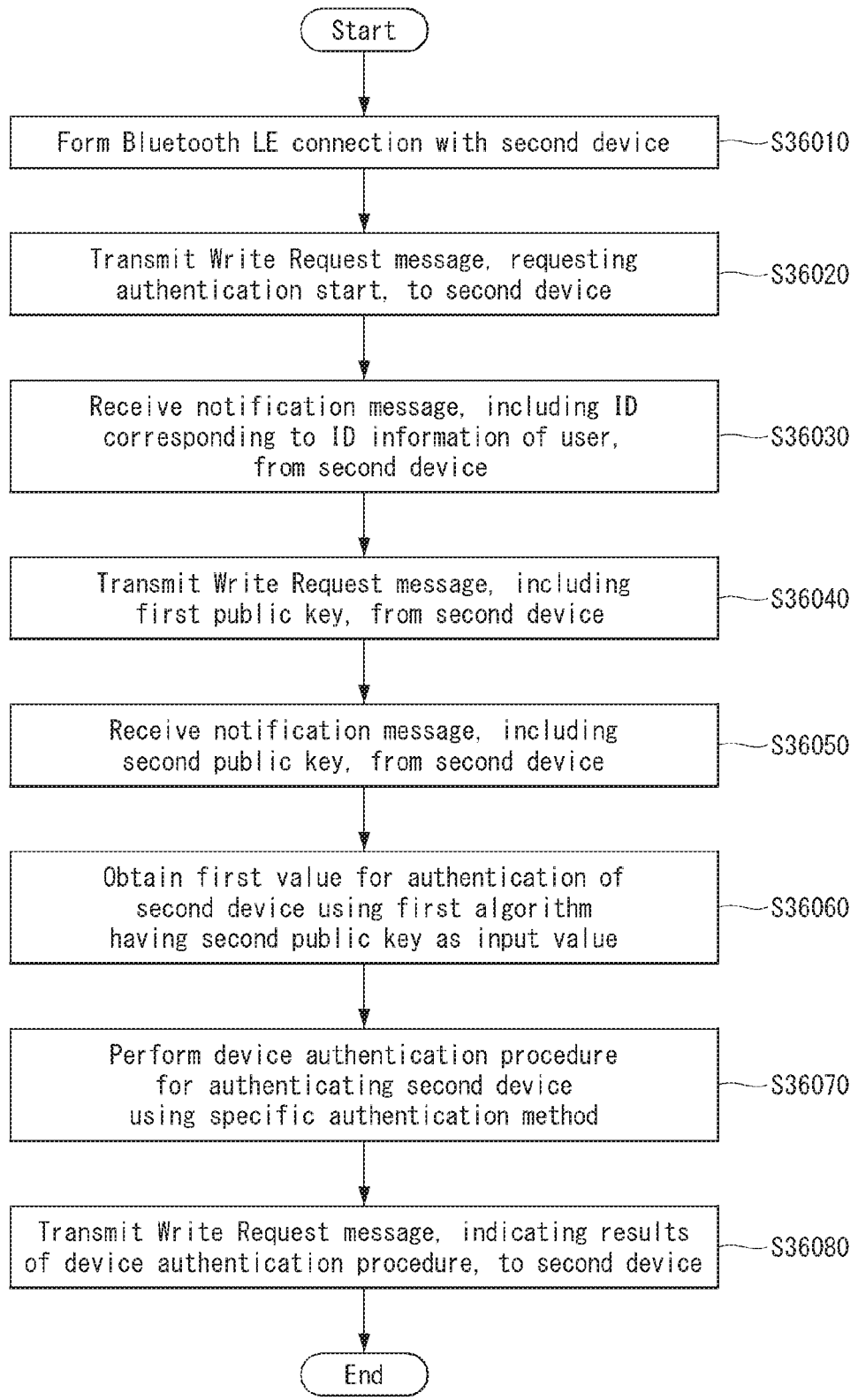
FIG. 36 shows an example of a flowchart in which a client performs authentication for device registration.

FIG. 36 shows an example of a flowchart in which a client performs authentication for device registration.

In the flowchart disclosed in FIG. 36, a first device corresponds to a client device, and a second device corresponds to a server device.

The client device forms a Bluetooth LE connection with the server device (S36010). This step may be performed identically with step S13010 of FIG. 13.

The client device transmits a Write Request message, requesting the start of an authentication procedure, to the server device (S36020). This step may be performed identically with step S14010 of FIG. 14.

The client device receives a notification message, including an ID corresponding to ID information of a user, from the server device (S36030). This step may be performed identically with step S14060 of FIG. 14.

The client device transmits a Write Request message, including a first public key (the public key of the client), to the server device (S36040). The Write Request message includes I/O information of the client device. For details thereof, reference is made to the description related to FIG. 26.

The client device receives a notification message, including a second public key (the public key of the server), from the server device (S36050). The notification message includes I/O information of the server device. For details thereof, reference is made to the description related to FIG. 26. The client device obtains a first value for the authentication of the server device using a first algorithm having the first public key as an input value (S36060). For details thereof, reference is made to the description related to FIG. 26.

The client device performs a device authentication procedure for authenticating the server device using a specific authentication method (S36070). For details thereof, reference is made to the description related to FIG. 26.

The client device transmits a Write Request message, indicating the results of the device authentication procedure, to the server device (S36080). This procedure may be performed identically with step S25100 of FIG. 25.

For the details of each step, reference is made to the description regarding the above-described drawings.

INDUSTRIAL APPLICABILITY

The above-described preferred embodiments of the present invention have been disclosed for illustrative purposes, and those skilled in the art may improve, change, substitute, or add various other embodiments without departing from the technical spirit and scope of the present invention disclosed in the attached claims.

What is claimed is:

1. A method of performing authentication by a first device using Bluetooth low energy (LE), the method comprising:
    forming a Bluetooth LE connection with a second device;
    obtaining identification information for identifying a user;
    performing a user authentication procedure of authenticating the user based on the identification information;
    transmitting, to the second device, a first notification message comprising an identifier corresponding to the identification information;
    receiving, from the second device, a write request message comprising a first public key;
    obtaining a first value for authentication of the second device using a first algorithm having the first public key as an input value;
    transmitting, to the second device, a second notification message comprising a second public key; and
    performing a device authentication procedure for authenticating the second device using a specific authentication method, and
    wherein the specific authentication method is determined based on an input/output capability of the first device.

2. The method of claim 1,
    wherein performing the device authentication procedure comprises:
    outputting specific information corresponding to the first value using the specific authentication method; and
    obtaining input information for authenticating the second device based on the output of the specific information.

3. The method of claim 2,
    wherein performing the device authentication procedure comprises:
    obtaining a second value through a second algorithm based on the input information; and completing the authentication of the second device based on the first value and the second value.

4. The method of claim 3, wherein in completing the device authentication, whether the device authentication is successful is determined based on whether the first value and the second value are identical.

5. The method of claim 1, wherein the device authentication procedure uses one method of a PIN, a password, a pattern, vibration and an LED.

6. The method of claim 1, wherein the identification information is one of a PIN, a gesture, a pattern, a password and bio information of the user.

7. The method of claim 1, wherein the write request message comprises information related to an input/output capability of the second device, and
wherein the second notification message comprises information related to the input/output capability of the first device.

8. The method of claim 1, further comprising receiving, from the second device, an authentication method determination message comprising the user authentication procedure or an execution method of the device authentication procedure, and
wherein the execution method is designated by the second device.

9. A method of performing authentication by a first device using Bluetooth low energy (LE), the method comprising:
forming a Bluetooth LE connection with a second device;
transmitting, to the second device, a write request message to request a start of an authentication procedure;
receiving, from the second device, a notification message comprising an identifier corresponding to identification information of a user;
transmitting, to the second device, a write request message comprising a first public key;
receiving, from the second device, a notification message comprising a second public key;
obtaining a first value for authentication of the second device using a first algorithm having the second public key as an input value;
performing a device authentication procedure for authenticating the second device using a specific authentication method; and
transmitting, to the second device, a write request message representing results of the device authentication procedure,
wherein the specific authentication method is determined based on an input/output capability of the first device.

10. The method of claim 9, wherein in performing the device authentication procedure,
outputting specific information corresponding to the first value using the specific authentication method; and
obtaining input information for authenticating the second device based on the output of the specific information.

11. The method of claim 10, wherein performing the device authentication procedure comprises:
obtaining a second value by the first device through a second algorithm based on the input information; and
completing the authentication of the second device based on the first value and the second value.

12. The method of claim 11, wherein in completing the device authentication, whether the device authentication is successful is determined based on whether the first value and the second value are identical.

13. The method of claim 9, wherein the device authentication procedure uses one method of a PIN, a password, a pattern, vibration and an LED.

14. A first device for performing authentication using Bluetooth low energy (LE), the first device comprising:
memory storing data; and
a processor controlling the memory,
wherein the first device is configured to:
form a Bluetooth LE connection with a second device;
obtain identification information for identifying a user;
perform a user authentication procedure of authenticating the user based on the identification information;
transmit, to the second device, a first notification message comprising an identifier corresponding to the identification information;
receive, from the second device, a write request message comprising a first public key;
obtain a first value for authentication of the second device using a first algorithm having the first public key as an input value;
transmit, to the second device, a second notification message comprising a second public key; and
perform a device authentication procedure for authenticating the second device using a specific authentication method, and
wherein the specific authentication method is determined based on an input/output capability of the first device.

15. The device of claim 14, wherein the device authentication procedure is performed by outputting, by the first device, specific information corresponding to the first value using the specific authentication method and obtaining input information for authenticating the second device based on the output of the specific information.

16. The device of claim 15, wherein the first device obtains a second value through a second algorithm based on the input information and completes the authentication of the second device based on the first value and the second value.

17. The device of claim 16, wherein the device authentication procedure is performed based on whether the first value and the second value are identical.

18. The device of claim 14, wherein the device authentication procedure uses one method of a PIN, a password, a pattern, vibration and an LED.

19. The device of claim 14, wherein the identification information is one of a PIN, a gesture, a pattern, a password and bio information of the user.

20. The device of claim 14, wherein when the user is a new user of the first device, the first device allocates a temporary identifier and stores the temporary identifier as an identifier of the user.

* * * * *